(12) United States Patent
Aoki

(10) Patent No.: US 7,646,585 B2
(45) Date of Patent: Jan. 12, 2010

(54) MULTILAYER CAPACITOR

(75) Inventor: Takashi Aoki, Tokyo (JP)

(73) Assignee: NGK Insulators, Ltd., Tokyo (JP)

( * ) Notice: Subject to any disclaimer, the term of this patent is extended or adjusted under 35 U.S.C. 154(b) by 2 days.

(21) Appl. No.: 12/240,589

(22) Filed: Sep. 29, 2008

(65) Prior Publication Data

US 2009/0128985 A1    May 21, 2009

(30) Foreign Application Priority Data

Nov. 15, 2007    (JP) .............................. 2007-297087

(51) Int. Cl.
*H01G 4/228* (2006.01)

(52) U.S. Cl. ................. 361/306.1; 361/306.3; 361/311; 361/313; 361/321.1; 361/321.2

(58) Field of Classification Search .............. 361/306.1, 361/306.3, 311–313, 321.1, 321.2, 308.1, 361/303–305, 301.1, 301.4, 301.5
See application file for complete search history.

(56) References Cited

U.S. PATENT DOCUMENTS

| | | | |
|---|---|---|---|
| 6,606,237 B1 * | 8/2003 | Naito et al. ............... | 361/306.3 |
| 6,704,189 B2 * | 3/2004 | Yoshii et al. .............. | 361/306.3 |
| 6,781,816 B2 * | 8/2004 | Togashi .................... | 361/306.3 |
| 6,819,543 B2 * | 11/2004 | Vieweg et al. ........... | 361/306.3 |
| 6,934,145 B2 * | 8/2005 | Hsieh et al. .............. | 361/321.2 |
| 6,940,708 B2 * | 9/2005 | Yoshii et al. ................ | 361/303 |
| 7,277,270 B2 * | 10/2007 | Sato et al. ................ | 361/321.1 |
| 7,310,217 B2 * | 12/2007 | Takashima et al. ....... | 361/306.3 |
| 2003/0102502 A1 | 6/2003 | Togashi | |
| 2004/0179325 A1 | 9/2004 | Togashi et al. | |
| 2005/0047059 A1 | 3/2005 | Togashi | |
| 2005/0219792 A1 | 10/2005 | Togashi et al. | |
| 2005/0264977 A1 | 12/2005 | Togashi | |
| 2008/0204968 A1 | 8/2008 | Takashima et al. | |

FOREIGN PATENT DOCUMENTS

| | | |
|---|---|---|
| JP | A-2003-168621 | 6/2003 |
| JP | A-2004-273701 | 9/2004 |
| JP | A-2005-079237 | 3/2005 |
| JP | A-2007-142296 | 6/2007 |
| WO | WO 2007/116566 A1 | 10/2007 |

* cited by examiner

*Primary Examiner*—Nguyen T Ha
(74) *Attorney, Agent, or Firm*—Oliff & Berridge, PLC

(57) ABSTRACT

A first internal electrode includes a first lead portion and a second lead portion. A second internal electrode includes a third lead portion and a fourth lead portion. A third internal electrode includes a main electrode portion and a fifth lead portion. A fourth internal electrode includes a main electrode portion and a sixth lead portion. A joint portion between the main electrode portion and the fifth lead portion of the third internal electrode is located between an edge on the first side face side and an edge on the second side face side in a capacitance forming region when viewed from an opposing direction of the third and fourth side faces. A joint portion between the main electrode portion and the sixth lead portion of the fourth internal electrode is located between an edge on the first side face side and an edge on the second side face side in a capacitance forming region when viewed from the opposing direction of the third and fourth side faces.

14 Claims, 12 Drawing Sheets

(a)

(b)

(a)

(b)

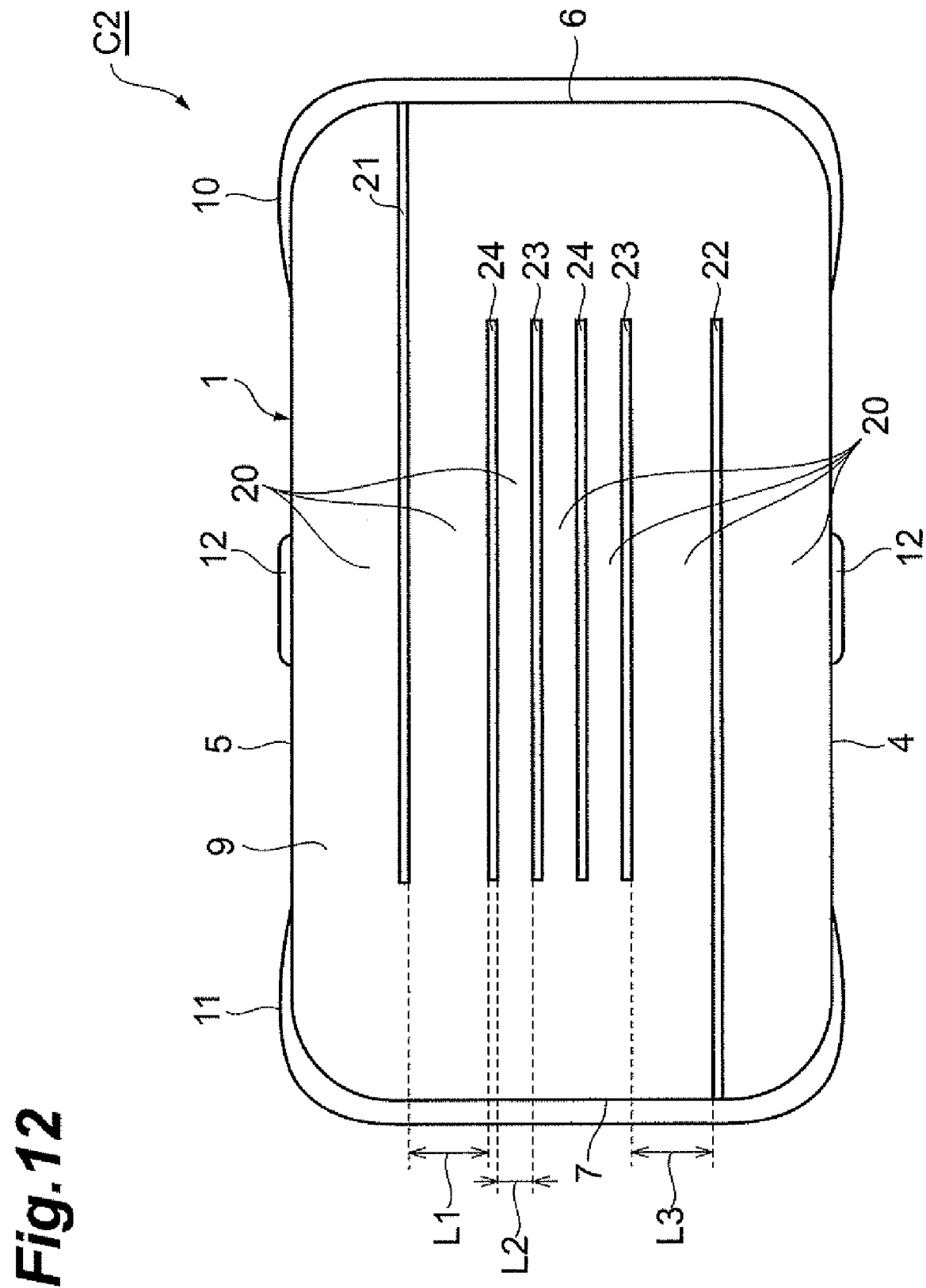

MULTILAYER CAPACITOR

BACKGROUND OF THE INVENTION

1. Field of the Invention

The present invention relates to a multilayer capacitor.

2. Related Background Art

There is a known multilayer capacitor having: a laminate body in which a plurality of internal electrodes are laminated with an insulator layer in between; a plurality of terminal electrodes arranged on side faces of the laminate body and isolated from each other; and a plurality of connection electrodes arranged on side faces of the laminate body and isolated from each other In the multilayer capacitor described in Japanese Patent Application Laid-open No. 2003-168621, the laminate body has four types of internal electrodes. Two out of the four types of internal electrodes each include a main electrode portion to make a capacitance, and a projection connected to the main electrode portion and extending so that one end thereof is exposed in the side face of the laminate body, to be connected to the connection electrode. The other two types of internal electrodes each include a lead portion extending so that one end thereof is exposed in the side face of the laminate body, to be connected to the terminal electrode, and a projection connected to this lead portion and extending so that one end thereof is exposed in the side face of the laminate body, to be connected to the connection electrode. In the latter two types of internal electrodes, the lead portion connected to the terminal electrode has a width large enough to achieve secure contact between the lead portion and the terminal electrode.

SUMMARY OF THE INVENTION

The multilayer capacitor can be used as a decoupling capacitor. When used as a decoupling capacitor, the multilayer capacitor is required to have high ESR but low ESL.

In the multilayer capacitor described in the aforementioned Application Laid-open No. 2003-168621, opposite electric currents flow in the main electrodes of the former two types of internal electrodes and, therefore, magnetic fields caused by the electric currents cancel each other out. As a result, the multilayer capacitor can have low ESL.

In the multilayer capacitor described in the Application Laid-open No. 2003-168621, however, the latter two types of internal electrodes have the wide lead portion and thus its ESR is low. In the multilayer capacitor of the Application Laid-open No. 2003-168621, therefore, there is a room for improvement in ESR while ensuring good contact between the lead portion and the terminal electrode.

An object of the present invention is therefore to provide a multilayer capacitor having increased ESR, without increase in ESL, while ensuring good contact between internal electrodes and terminal electrodes.

The present invention provides a multilayer capacitor comprising: a laminate body in which a plurality of internal electrodes are laminated with an insulator layer in between; and a plurality of external electrodes arranged on side faces of the laminate body and isolated from each other, wherein the laminate body has, as the internal electrodes, a first internal electrode, a second internal electrode arranged with a space in a laminating direction from the first internal electrode, and third and fourth internal electrodes arranged between the first internal electrode and the second internal electrode, and the first and second internal electrodes are located at outermost positions among the internal electrodes, wherein the laminate body has, as the side faces, first and second side faces extending along the laminating direction and facing each other, and third and fourth side faces extending along the laminating direction, extending along a direction intersecting with the first and second side faces, and facing each other, wherein the external electrodes include first and second terminal electrodes and first and second connection electrodes, wherein the first terminal electrode is arranged on the first side face, the second terminal electrode is arranged on the second side face, the first connection electrode is arranged on the third side face, and the second connection electrode is arranged on the fourth side face, wherein the first internal electrode includes: a first lead portion extending so that one end thereof with a first width is exposed from the first side face, to be connected to the first terminal electrode; and a second lead portion connected to the first lead portion, and extending so that one end thereof with a second width is exposed from the third side face, to be connected to the first connection electrode, wherein the second internal electrode includes: a third lead portion extending so that one end thereof with a third width is exposed from the second side face, to be connected to the second terminal electrode; and a fourth lead portion connected to the third lead portion, and extending so that one end thereof with a fourth width is exposed from the fourth side face, to be connected to the second connection electrode, wherein the third internal electrode includes: a main electrode portion; and a fifth lead portion connected to an edge of the main electrode portion of the third internal electrode located on the third side face side, and extending so that one end thereof with a fifth width is exposed from the third side face, to be connected to the first connection electrode, wherein the fourth internal electrode includes: a main electrode portion; and a sixth lead portion connected to an edge of the main electrode portion of the fourth internal electrode located on the fourth side face side, and extending so that one end thereof with a sixth width is exposed from the fourth side face, to be connected to the second connection electrode, wherein the main electrode portions of the third and fourth internal electrodes include respective capacitance forming regions which overlap each other when viewed from the laminating direction, wherein a joint portion between the main electrode portion and the fifth lead portion of the third internal electrode is located between an edge on the first side face side and an edge on the second side face side in the capacitance forming region when viewed from an opposing direction of the third and fourth side faces, wherein a joint portion between the main electrode portion and the sixth lead portion of the fourth internal electrode is located between an edge on the first side face side and an edge on the second side face side in the capacitance forming region when viewed from the opposing direction of the third and fourth side faces, and wherein each of the first to fourth widths is not more than the fifth and sixth widths.

In the multilayer capacitor according to the present invention, each of the first and second internal electrodes has two lead portions. The widths of the one ends of these lead portions are not more than the widths of the one ends of the lead portions of the third and fourth internal electrodes. Therefore, each electric current path has a narrowed portion in the width of the path, which increases ESR.

The third and fourth internal electrodes include their respective capacitance forming regions overlapping each other when viewed from the laminating direction. In each of the third and fourth internal electrodes the joint portion between the main electrode and the lead portion is located between one edge and the other edge of the capacitance forming region when viewed from the opposing direction of the third and fourth side faces. The lead portion of the third internal electrode is located on the third side face side and the lead portion of the fourth internal electrode on the fourth side face side. Therefore, the lead portion of the third internal electrode and the lead portion of the fourth internal electrode, when viewed from the laminating direction, are in a mutually almost opposed state near the middle portion of the capacitance forming region. Since the lead portions are in this positional relation, directions of electric currents flowing to the both edges become opposite to each other in the capacitance forming region of the third internal electrode and in the capacitance forming region of the fourth internal electrode. As a consequence, magnetic fields caused by the electric currents cancel each other out in part in the third internal electrode and in the fourth internal electrode, which can decrease the ESL of the multilayer capacitor.

In the multilayer capacitor according to the present invention, the first and second internal electrodes are located at the outermost positions among the internal electrodes. It is common practice to subject the laminate body to barrel polishing before formation of the external electrodes, and the ridge portions of the laminate body are significantly shaved by the barrel polishing. In the multilayer capacitor according to the present invention, the first and second internal electrodes are located at the outermost positions among the internal electrodes, whereby the positions of the lead portions of these internal electrodes are made closer to the ridge lines. The lead portions near the ridge lines are strongly affected by the barrel polishing, so as to be certainly exposed. Therefore, while the multilayer capacitor of the present invention has the lead portions of the first and second internal electrodes relatively narrow, these are surely exposed. For this reason, good contact can be made between the first and second internal electrodes and the external electrodes disposed on the side faces of the laminate body.

Preferably, the first width is smaller than the second width and the third width is smaller than the fourth width.

In this case, the lead portions connected to the terminal electrodes become narrower, which can further increase the ESR.

Preferably, in the laminating direction, a distance between the first internal electrode and the third or fourth internal electrode adjacent to the first internal electrode with the insulator layer in between is larger than a distance between the third internal electrode and the fourth internal electrode adjacent to the third internal electrode with the insulator layer in between, and in the laminating direction, a distance between the second internal electrode and the third or fourth internal electrode adjacent to the second internal electrode with the insulator layer in between is larger than the distance between the third internal electrode and the fourth internal electrode adjacent to the third internal electrode with the insulator layer in between.

In this case, the distance between the first internal electrode and the third and fourth internal electrodes and the distance between the second internal electrode and the third and fourth internal electrodes become larger. In consequence, the first and second internal electrodes are located further outside in the laminate body and the lead portions of these internal electrodes are made much closer to the ridge lines of the laminate body. Therefore, it becomes feasible to implement surer exposure of the lead portions by barrel polishing, whereby better contact can be made between the first and second internal electrodes and the external electrodes.

When the lead portions of the first and second internal electrodes are narrow, the resistance becomes larger, which raises the concern of heat generation by ripple current. Radiation of heat is enhanced from the first and second internal electrodes when a gap is provided between the first internal electrode and the third and fourth internal electrodes and between the second internal electrode and the third and fourth internal electrodes. In this case, the multilayer capacitor can be prevented from becoming hot due to the heat generation in the internal electrodes.

Preferably, the laminate body has one each of the first and second internal electrodes.

In this case, there are only one internal electrode connected to the first terminal electrode and only one internal electrode connected to the second terminal electrode, which can further increase the ESR.

Preferably, in the laminating direction, the first internal electrode is adjacent to the fourth internal electrode with the insulator layer in between and the second internal electrode is adjacent to the third internal electrode with the insulator layer in between.

In this case, the first internal electrode connected to the first connection electrode is adjacent to the fourth internal electrode connected to the second connection electrode, and, therefore, directions of electric currents become opposite to each other at least in partial regions. For this reason, magnetic fields caused by the electric currents cancel each other out in part between the first internal electrode and the fourth internal electrode. Since the second internal electrode connected to the second connection electrode is adjacent to the third internal electrode connected to the first connection electrode and, therefore, magnetic fields caused by electric currents cancel each other out in part between the second internal electrode and the third internal electrode. As a result of these, cancellation of magnetic fields occurs between the first internal electrode and the fourth internal electrode and between the second internal electrode and the third internal electrode, which can further decrease the ESL of the multilayer capacitor.

Preferably, a width of the other end of the second lead portion is larger than the second width; the other end of the second lead portion is connected to the other end of the first lead portion and opposed to the main electrode portion of the fourth internal electrode in the laminating direction; a width of the other end of the fourth lead portion is larger than the fourth width; and the other end of the fourth lead portion is connected to the other end of the third lead portion and opposed to the main electrode portion of the third internal electrode in the laminating direction.

In this case, a capacitance is formed between the other end of the lead portion of the first internal electrode and the main electrode portion of the fourth internal electrode and a capacitance is formed between the other end of the lead portion of the second internal electrode and the main electrode portion of the third internal electrode. Therefore, the capacitance of the multilayer capacitor is increased.

The present invention provides another multilayer capacitor comprising: a laminate body in which a plurality of internal electrodes are laminated with an insulator layer in between; and a plurality of external electrodes arranged on side faces of the laminate body and isolated from each other, wherein the laminate body has first, second, third, and fourth internal electrodes as the internal electrodes, wherein the laminate body has, as the side faces, first and second side faces extending along a laminating direction and facing each other, and third and fourth side faces extending along the laminating direction, extending along a direction intersecting with the first and second side faces, and facing each other, wherein the external electrodes include first and second terminal electrodes and first and second connection electrodes, wherein the first terminal electrode is arranged on the first side face, the second terminal electrode is arranged on the second side face, the first connection electrode is arranged on the third side face, and the second connection electrode is arranged on the fourth side face, wherein the first internal electrode includes: a first lead portion extending so that one end thereof with a first width is exposed from the first side face, to be connected to the first terminal electrode; and a second lead portion connected to the first lead portion, and extending so that one end thereof with a second width is exposed from the third side face, to be connected to the first connection electrode, wherein the second internal electrode includes: a third lead portion extending so that one end thereof with a third width is exposed from the second side face, to be connected to the second terminal electrode; and a fourth lead portion connected to the third lead portion, and extending so that one end thereof with a fourth width is exposed from the fourth side face, to be connected to the second connection electrode, wherein the third internal electrode includes: a main electrode portion; and a fifth lead portion connected to an edge of the main electrode portion of the third internal electrode located on the third side face side, and extending so that one end thereof with a fifth width is exposed from the third side face, to be connected to the first connection electrode, wherein the fourth internal electrode includes: a main electrode portion; and a sixth lead portion connected to an edge of the main electrode portion of the fourth internal electrode located on the fourth side face side, and extending so that one end thereof with a sixth width is exposed from the fourth side face, to be connected to the second connection electrode, wherein the main electrode portions of the third and fourth internal electrodes include respective capacitance forming regions which overlap each other when viewed from the laminating direction, wherein a joint portion between the main electrode portion and the fifth lead portion of the third internal electrode is located between an edge on the first side face side and an edge on the second side face side in the capacitance forming region when viewed from an opposing direction of the third and fourth side faces, wherein a joint portion between the main electrode portion and the sixth lead portion of the fourth internal electrode is located between an edge on the first side face side and an edge on the second side face side in the capacitance forming region when viewed from the opposing direction of the third and fourth side faces, wherein each of the first to fourth widths is not more than the fifth and sixth widths, wherein, when viewed from the laminating direction, the one end of the first lead portion is exposed from a position nearer to the third side face or from a position nearer to the fourth side face in the first side face, and wherein, when viewed from the laminating direction, the one end of the third lead portion is exposed from a position nearer to the third side face or from a position nearer to the fourth side face in the second side face.

In the multilayer capacitor according to the present invention, each of the first and second internal electrodes has two lead portions. The widths of the one ends of these lead portions are not more than the widths of the one ends of the lead portions of the third and fourth internal electrodes. Therefore, each electric current path has a narrowed portion in the width of the path, which increases ESR.

The main electrode portions of the third and fourth internal electrodes include their respective capacitance forming regions overlapping each other when viewed from the laminating direction. In each of the third and fourth internal electrodes, the joint portion between the main electrode and the lead portion is located between one edge and the other edge of the capacitance forming region when viewed from the opposing direction of the third and fourth side faces. The lead portion of the third internal electrode is located on the third side face side and the lead portion of the fourth internal electrode on the fourth side face side. Namely, the lead portion of the third internal electrode and the lead portion of the fourth internal electrode, when viewed from the laminating direction, are in a mutually almost opposed state in the middle portion of the capacitance forming region. Since the lead portions are in this positional relation, directions of electric currents flowing to the both edges become opposite to each other in the capacitance forming region of the third internal electrode and in the capacitance forming region of the fourth internal electrode. As a consequence, magnetic fields caused by the electric currents cancel each other out in part in the third internal electrode and in the fourth internal electrode, which can decrease the ESL of the multilayer capacitor.

In the first internal electrode, the one end of the lead portion is exposed from the position nearer to the third side face or from the position nearer to the fourth side face in the first side face. This one end of the lead portion is located near the ridge line of the laminate body made by the first side face and the third or fourth side face. In the second internal electrode, the one end of the lead portion is exposed from the position nearer to the third side face or from the position nearer to the fourth side face in the second side face. This one end of the lead portion is located near the ridge line of the laminate body made by the second side face and the third or fourth side face. The lead portions near the ridge lines are surely exposed during the barrel polishing of the laminate body. Therefore, while the multilayer capacitor of the present invention has the lead portions of the first and second internal electrodes relatively narrow, these can be surely exposed. For this reason, good contact can be made between the first and second internal electrodes and the external electrodes disposed on the side faces of the laminate body.

Preferably, the first width is smaller than the second width and the third width is smaller than the fourth width.

In this case, the lead portions connected to the terminal electrodes become narrower, which can further increase the ESR.

Preferably, in the laminating direction, a distance between the first internal electrode and the third or fourth internal electrode adjacent to the first internal electrode with the insulator layer in between is larger than a distance between the third internal electrode and the fourth internal electrode adjacent to the third internal electrode with the insulator layer in between, and in the laminating direction, a distance between the second internal electrode and the third or fourth internal electrode adjacent to the second internal electrode with the insulator layer in between is larger than the distance between the third internal electrode and the fourth internal electrode adjacent to the third internal electrode with the insulator layer in between.

In this case, the distance between the first internal electrode and the third and fourth internal electrodes and the distance between the second internal electrode and the third and fourth internal electrodes become larger, whereby the first and second internal electrodes are located further outside in the laminate body. For this reason, the lead portions of the first and second internal electrodes are made much closer to the ridge lines of the laminate body. As a consequence, it becomes feasible to implement surer exposure of the lead portions by barrel polishing, whereby better contact can be made between the first and second internal electrodes and the external electrodes. Radiation of heat is enhanced when a gap is provided between the first internal electrode and the third and fourth internal electrodes and between the second internal electrode and the third and fourth internal electrodes, whereby the multilayer capacitor can be prevented from becoming hot due to heat generation in the internal electrodes.

Preferably, the laminate body has one each of the first and second internal electrodes.

In this case, there are only one internal electrode connected to the first terminal electrode and only one internal electrode connected to the second terminal electrode, which can further increase the ESR.

Preferably, in the laminating direction, the first internal electrode is adjacent to the fourth internal electrode with the insulator layer in between and the second internal electrode is adjacent to the third internal electrode with the insulator layer in between.

In this case, since the first internal electrode connected to the first connection electrode is adjacent to the fourth internal electrode connected to the second connection electrode, directions of electric currents become opposite to each other at least in partial regions. Since the second internal electrode connected to the second connection electrode is adjacent to the third internal electrode connected to the first connection electrode, directions of electric currents become opposite to each other at least in partial regions. As a result of these, cancellation of magnetic fields occurs between the first internal electrode and the fourth internal electrode and between the second internal electrode and the third internal electrode, which can further decrease the ESL of the multilayer capacitor.

Preferably, a width of the other end of the second lead portion is larger than the second width; the other end of the second lead portion is connected to the other end of the first lead portion and opposed to the main electrode portion of the fourth internal electrode in the laminating direction; a width of the other end of the fourth lead portion is larger than the fourth width; and the other end of the fourth lead portion is connected to the other end of the third lead portion and opposed to the main electrode portion of the third internal electrode in the laminating direction.

In this case, a capacitance is formed between the other end of the lead portion of the first internal electrode and the main electrode portion of the fourth internal electrode and a capacitance is formed between the other end of the lead portion of the second internal electrode and the main electrode portion of the third internal electrode. Therefore, the capacitance of the multilayer capacitor is increased.

Preferably, when viewed from the laminating direction, the one end of the first lead portion is exposed from a position nearer to the fourth side face in the first side face, and when viewed from the laminating direction, the one end of the third lead portion is exposed from a position nearer to the third side face in the second side face.

In this case, the total length of the two lead portions in the first internal electrode becomes relatively longer. The total length of the two lead portions in the second internal electrode also becomes relatively longer. When the lead portions of the first and second internal electrodes are made longer as in this case, the ESR of the multilayer capacitor can be increased.

Preferably, the first internal electrode further includes a seventh lead portion extending so that one end thereof with a seventh width is exposed from the first side face, to be connected to the first terminal electrode; the second internal electrode further includes an eighth lead portion extending so that one end thereof with an eighth width is exposed from the second side face, to be connected to the second terminal electrode; the other end of the seventh lead portion is connected to the second lead portion; the other end of the eighth lead portion is connected to the fourth lead portion; and each of the seventh and eighth widths is not more than the fifth and sixth widths.

In this case, the two lead portions of the first internal electrode are connected to the first terminal electrode and the two lead portions of the second internal electrode are connected to the second terminal electrode. Since this configuration increases the number of connection portions between the first and second internal electrodes and the first and second terminal electrodes, contact of these can be further improved.

The present invention successfully provides the multilayer capacitor having the increased ESR, without increase in ESL, while ensuring good contact between the internal electrodes and the terminal electrodes.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 12 is a sectional view of a multilayer capacitor according to the second embodiment.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference symbols, without redundant description.

First Embodiment

Figure 1:
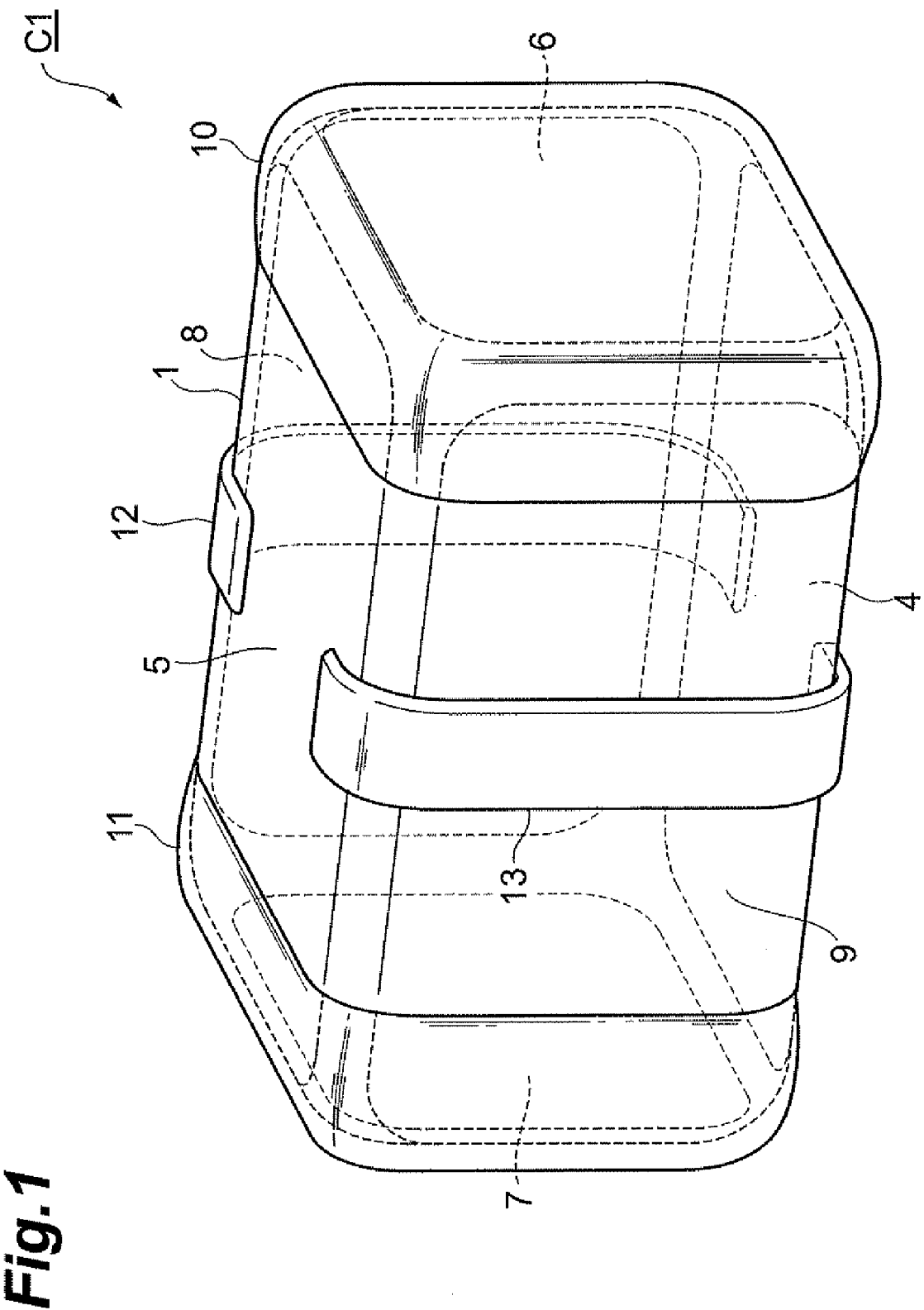
FIG. 1 is a perspective view of a multilayer capacitor according to the first embodiment.
Figure 2:
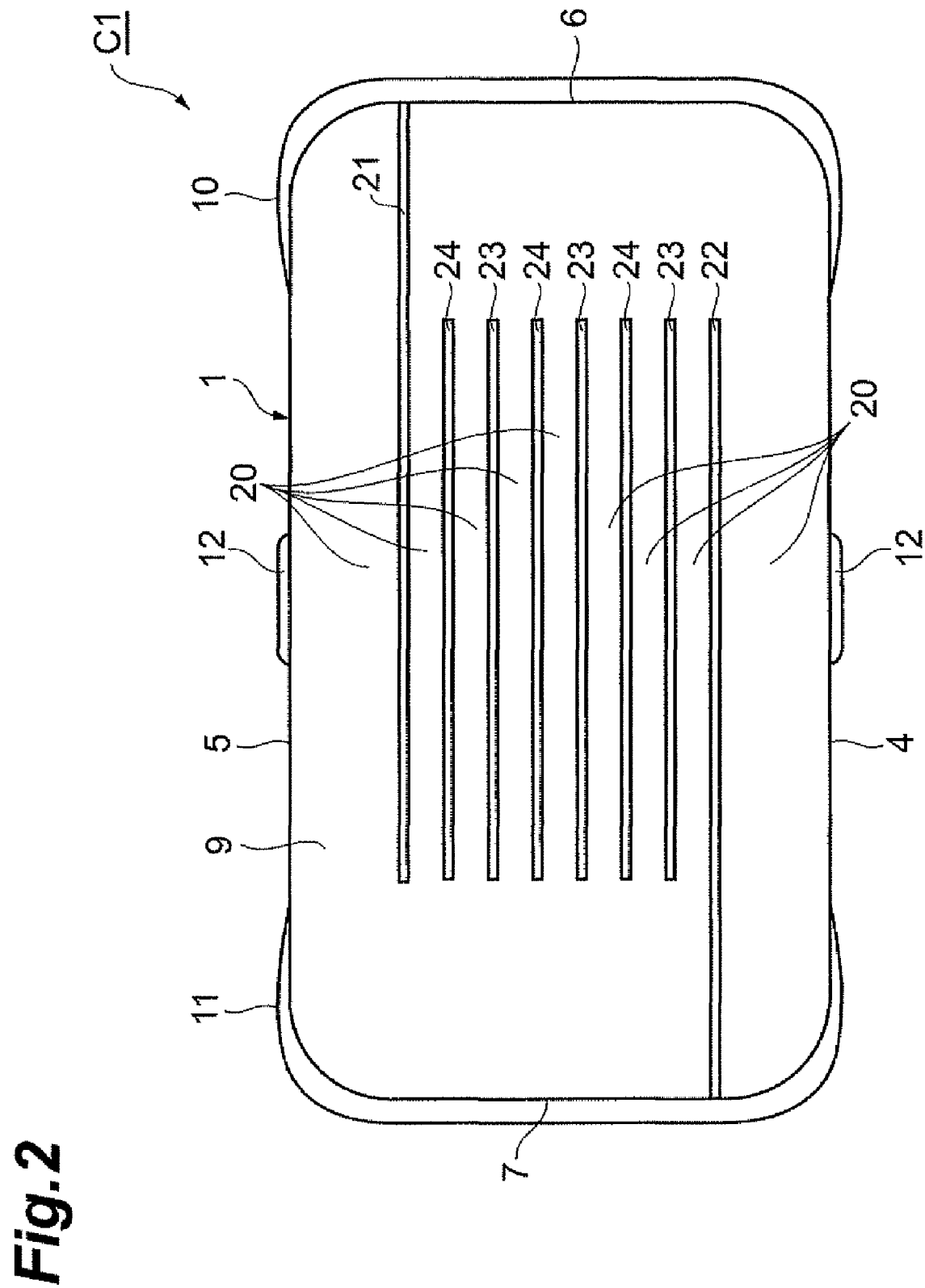
FIG. 2 is a sectional view of the multilayer capacitor of the first embodiment.
Figure 3:
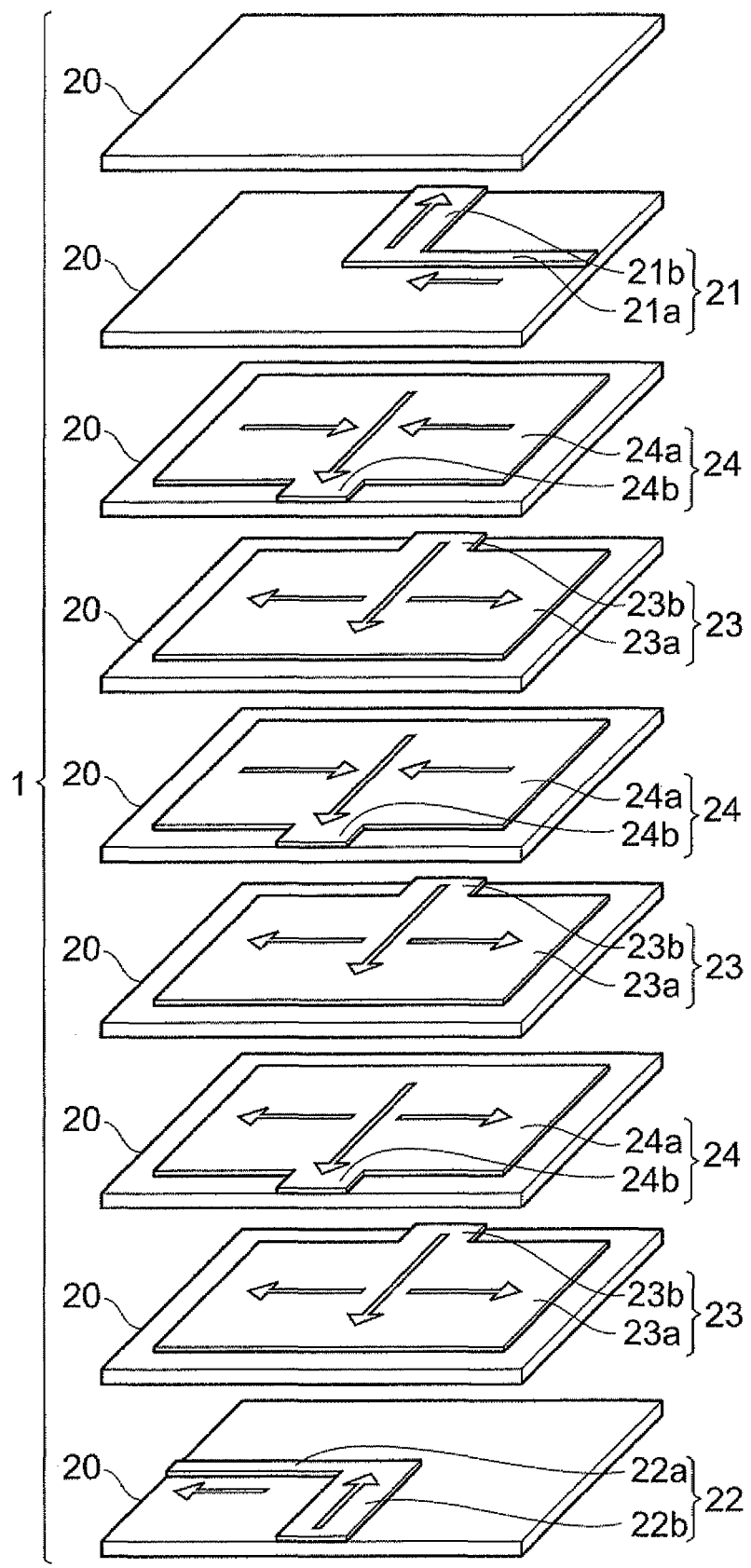
FIG. 3 is an exploded perspective view of a laminate body in the multilayer capacitor of the first embodiment.
Figure 4:
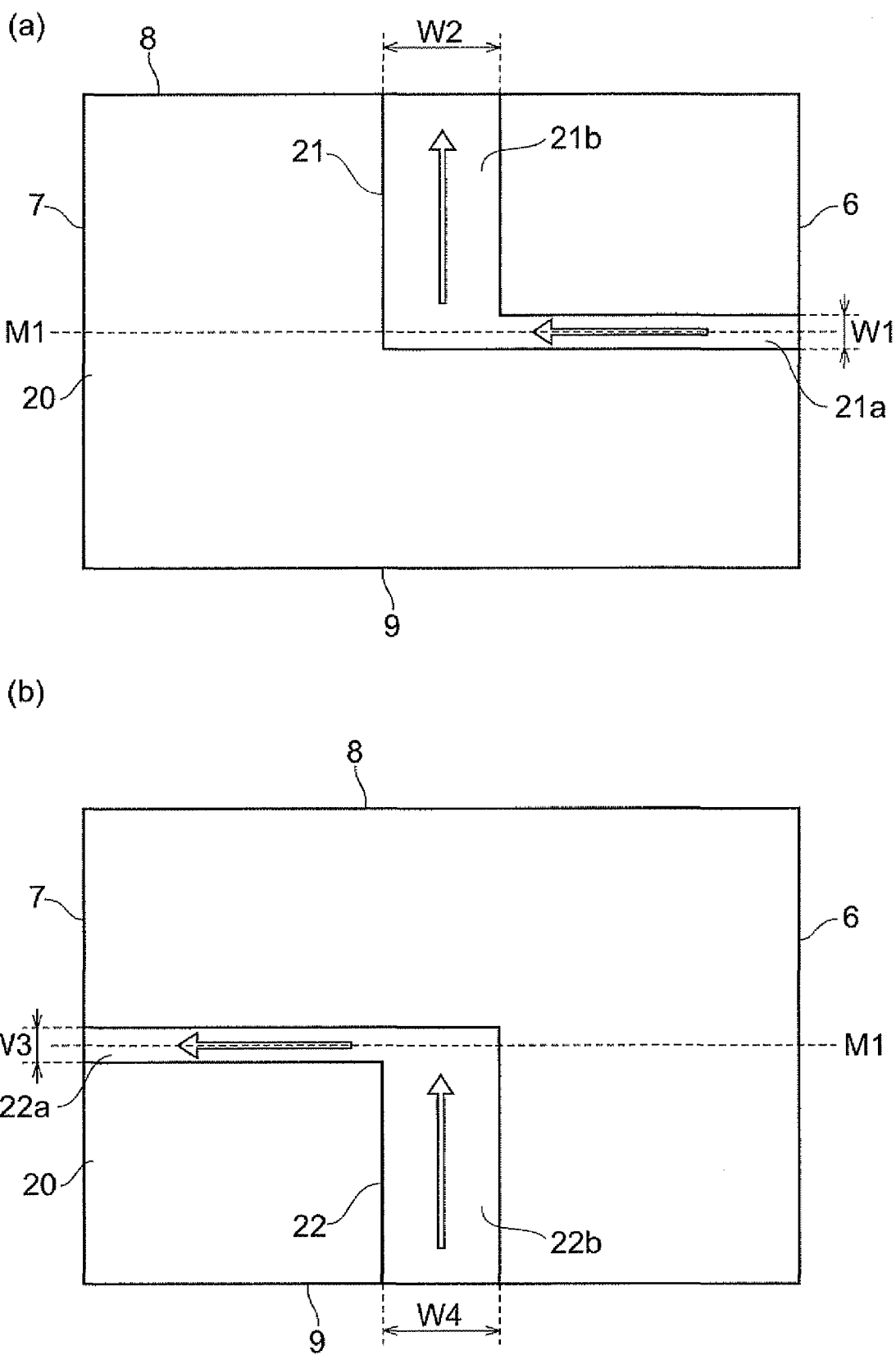
FIG. 4 is a drawing showing first and second internal electrodes in the multilayer capacitor of the first embodiment.
Figure 5:
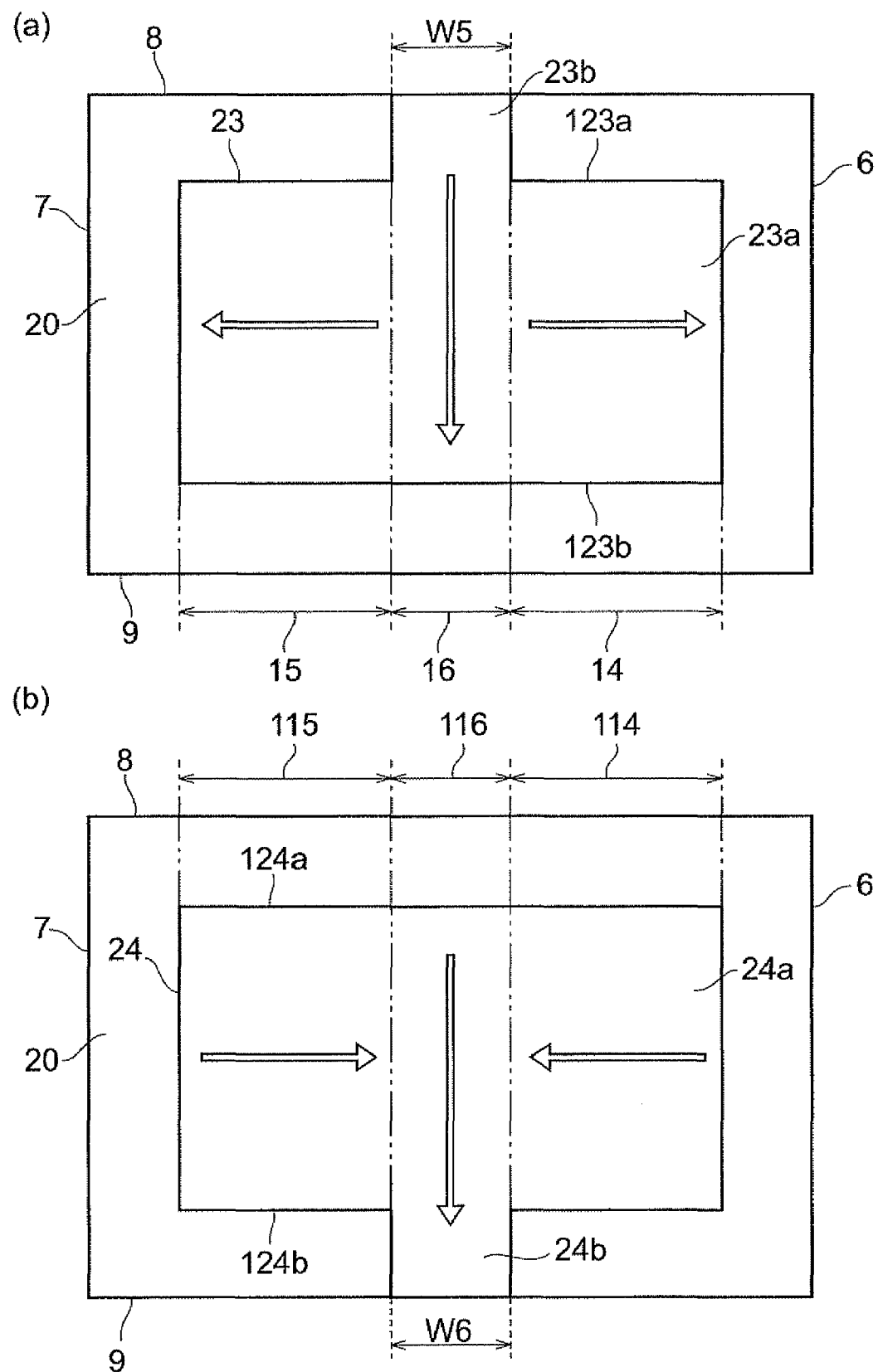
FIG. 5 is a drawing showing third and fourth internal electrodes in the multilayer capacitor of the first embodiment.

FIG. 1 is a perspective view of a multilayer capacitor according to the first embodiment. FIG. 2 is a sectional view of the multilayer capacitor according to the first embodiment. FIG. 3 is an exploded perspective view of a laminate body in the multilayer capacitor according to the first embodiment. FIG. 4(a) is a drawing showing a first internal electrode in the multilayer capacitor of the first embodiment and FIG. 4(b) a drawing showing a second internal electrode in the multilayer capacitor. FIG. 5(a) is a drawing showing a third internal electrode in the multilayer capacitor of the first embodiment and FIG. 5(b) a drawing showing a fourth internal electrode in the multilayer capacitor. FIGS. 3 to 5 show states before barrel polishing of the laminate body.

The multilayer capacitor C1, as shown in FIG. 1, has a laminate body 1 of a rectangular parallelepiped shape, and external electrodes disposed on the exterior surface of the laminate body 1. The laminate body 1 includes first principal face 4 and second principal face 5 of a rectangular shape, first side face 6 and second side face 7 opposed to each other, and third side face 8 and fourth side face 9 opposed to each other. The first and second side faces 6, 7 extend in the shorter-side direction of the first and second principal faces 4, 5 so as to connect between the first and second principal faces 4, 5. The third and fourth side faces 8, 9 extend in the longer-side direction of the first and second principal faces 4, 5 so as to connect between the first and second side faces 6, 7. The laminate body 1 shown in FIG. 1 has the ridge portions chamfered by a barrel polishing process.

A first terminal electrode 10 as an external electrode is arranged on the first side face 6 of the laminate body 1. The first terminal electrode 10 is formed across the first and second principal faces 4, 5 and the third and fourth side faces 8, 9 so as to cover the first side face 6. A second terminal electrode 11 as an external electrode is arranged on the second side face 7 of the laminate body 1. The second terminal electrode 11 is formed across the first and second principal faces 4, 5 and the third and fourth side faces 8, 9 so as to cover the second side face 7. The first terminal electrode 10 and the second terminal electrode 11 are isolated from each other.

A first connection electrode 12 as an external electrode is arranged on the third side face 8 of the laminate body 1. The first connection electrode 12 is of a strip shape and is formed so that one end thereof is located on the first principal face 4 and the other end on the second principal face 5. A second connection electrode 13 as an external electrode is arranged on the fourth side face 9 of the laminate body 1. The second connection electrode 13 is of a strip shape and is formed so that one end thereof is located on the first principal face 4 and the other end thereof on the second principal face 5. The second connection electrode 13 is arranged so as to be opposed to the first connection electrode 12. The first connection electrode 12 and the second connection electrode 13 are isolated from each other.

The first and second terminal electrodes 10, 11 and the first and second connection electrodes 12, 13 are formed, for example, by applying an electroconductive paste containing electroconductive metal powder and glass frit, onto the corresponding external faces of the laminate body 1 and sintering it. Plated layers may be formed on the sintered electrodes as occasion may demand.

The laminate body 1, as shown in FIGS. 2 and 3, is composed of a plurality of insulator layers 20 (at least nine layers in the present embodiment) and a plurality of internal electrodes which are alternately laminated. The laminate body 1 has a first internal electrode 21, a second internal electrode 22, a plurality of third internal electrodes 23 (three layers in the present embodiment), and a plurality of fourth internal electrodes 24 (three layers in the present embodiment) as a plurality of internal electrodes. The layers are laminated in the following order from the first principal face 4 to the second principal face 5 in the laminate body 1: insulator layer 20; second internal electrode 22; insulator layer 20; third internal electrode 23; insulator layer 20; fourth internal electrode 24; insulator layer 20; third internal electrode 23; insulator layer 20; fourth internal electrode 24; insulator layer 20; third internal electrode 23; insulator layer 20; fourth internal electrode 24; insulator layer 20; first internal electrode 21; insulator layer 20. Therefore, the first and second internal electrodes 21, 22 are the outermost layers among the internal electrodes.

The insulator layers 20 extend in a direction parallel to the first and second principal faces 4, 5. Therefore, the first to fourth side faces 6-9 are faces along a direction where the insulator layers 20 are laminated (which will be referred to hereinafter simply as "laminating direction") and the first and second principal faces 4, 5 are faces opposed to each other in the laminating direction. Each insulator layer 20 is composed, for example, of a sintered body of a ceramic green sheet containing a dielectric ceramic. In the practical multilayer capacitor C1, the insulator layers 20 are integrally formed so that no border can be visually recognized between the insulator layers 20.

The first to fourth internal electrodes 21-24 contain, for example, nickel as a main component. The first internal electrode 21 includes a lead portion 21a and a lead portion 21b. The lead portion 21a extends so that one end thereof is exposed in the first side face 6. As shown in FIG. 4(a), the lead portion 21a is located on a center line M1 when viewed from the laminating direction. The center line M1 is a line connecting a center of one short side of the first and second principal faces 4, 5 and a center of the other short side of the first and second principal faces 4, 5.

More specifically, the lead portion 21a, when viewed from the laminating direction, extends from the center portion of the laminate body 1 toward the first side face 6 and along the longer-side direction of the first and second principal faces 4, 5. The one end of the lead portion 21a exposed in the first side face 6 is electrically and mechanically connected to the first terminal electrode 10.

The lead portion 21b extends so that one end thereof is exposed in the third side face 8. The lead portion 21b, when viewed from the laminating direction, extends from the center portion toward the third side face 8 and along the shorter-side direction of the first and second principal faces 4, 5. The one end of the lead portion 21b exposed in the third side face 8 is electrically and mechanically connected to the first connection electrode 12. The other end of the lead portion 21b is coupled to the other end of the lead portion 21a. The width W1 of the one end of the lead portion 21a is smaller than the width W2 of the one end of the lead portion 21b.

As shown in FIG. 2, the second internal electrode 22 is arranged with a space in the laminating direction from the first internal electrode 21. As shown in FIG. 3, the second internal electrode 22 includes a lead portion 22a and a lead portion 22b.

The lead portion 22a extends so that one end thereof is exposed in the second side face 7. As shown in FIG. 4(b), the lead portion 22a is located on the center line M1 when viewed from the laminating direction.

More specifically, the lead portion 22a, when viewed from the laminating direction, extends from the center portion of the laminate body 1 toward the second side face 7 and along the longer-side direction of the first and second principal faces 4, 5. The one end of the lead portion 22a exposed in the second side face 7 is electrically and mechanically connected to the second terminal electrode 11.

The lead portion 22b extends so that one end thereof is exposed in the fourth side face 9. The lead portion 22b, when viewed from the laminating direction, extends from the center portion toward the fourth side face 9 and along the shorter-side direction of the first and second principal faces 4, 5. The one end of the lead portion 22b exposed in the fourth side face 9 is electrically and mechanically connected to the second connection electrode 13. The other end of the lead portion 22b is coupled to the other end of the lead portion 22a. The width W3 of the one end of the lead portion 22a is smaller than the width W4 of the one end of the lead portion 22b.

As shown in FIG. 2, the third internal electrodes 23 are located between the first internal electrode 21 and the second internal electrode 22. Each third internal electrode 23 includes a main electrode portion 23a and a lead portion 23b.

As shown in FIG. 3, the main electrode portion 23a is of a rectangular shape and its longer-side direction agrees with the longer-side direction of the first and second principal faces 4, 5. The main electrode portion 23a has a pair of edges 123a, 123b extending in the longer-side direction. The edge 123a is located on the third side face 8 side and the edge 123b is located on the fourth side face 9 side.

The main electrode portion 23a includes a capacitance forming region. The capacitance forming region is a region that overlaps with a main electrode portion 24a of the fourth internal electrode 24 described below, when viewed from the laminating direction. In the present embodiment, the main electrode portion 23a and the main electrode portion 24a overlap throughout. For this reason, the whole of the main electrode portion 23a serves as a capacitance forming region. The capacitance forming region or main electrode portion 23a consists of end portions 14, 15 and a middle portion 16. The end portion 14 is located on the first side face 6 side of the laminate body 1 and the end portion 15 on the second side face 7 side of the laminate body 1. The middle portion 16 is located between the end portion 14 and the end portion 15.

The lead portion 23b is connected to the main electrode portion 23a and is located on the third side face 8 side with respect to the main electrode portion 23a. The lead portion 23b extends from the edge 123a of the main electrode portion 23a toward the third side face 8 of the laminate body 1 so that one end thereof is exposed from the third side face 8 and the other end is connected to the edge 123a of the main electrode portion 23a. The exposed one end of the lead portion 23b is electrically and mechanically connected to the first connection electrode 12. The other end of the lead portion 23b is connected to the middle portion 16 of the main electrode portion 23a when viewed from the opposing direction of the third and fourth side faces 8, 9. The width W5 of the one end of the lead portion 23b is equal to the width W2 of the one end of the lead portion 21b.

As shown in FIGS. 2 and 3, the fourth internal electrodes 24 are located between the first internal electrode 21 and the second internal electrode 22 and laminated as alternating with the third internal electrodes 23 with the insulator layer 20 in between. Each fourth internal electrode 24 includes a main electrode portion 24a and a lead portion 24b.

The main electrode portion 24a is of a rectangular shape and its longer-side direction agrees with the longer-side direction of the first and second principal faces 4, 5. As shown in FIG. 5(b), the main electrode portion 24a has a pair of edges 124a, 124b extending in the longer-side direction. The edge 124a is located on the third side face 8 side and the edge 124b on the fourth side face 9 side.

The main electrode portion 24a includes a capacitance forming region. The capacitance forming region is a region that overlaps with the main electrode portion 23a of the third internal electrode 23 when viewed from the laminating direction. In the present embodiment, the main electrode portion 24a and the main electrode portion 23a overlap throughout. For this reason, the whole of the main electrode portion 24a serves as a capacitance forming region. The capacitance forming region or main electrode portion 24a consists of end portions 114, 115 and a middle portion 116. The end portion 114 is located on the first side face 6 side of the laminate body 1 and the end portion 115 is located on the second side face 7 side of the laminate body 1. The middle portion 116 is located between the end portion 114 and the end portion 115.

The lead portion 24b is connected to the main electrode portion 24a and is located on the fourth side face 9 side with respect to the main electrode portion 24a. The lead portion 24b extends from the edge 124b of the main electrode portion 24a toward the fourth side face 9 of the laminate body 1 so that one end thereof is exposed from the fourth side face 9 and the other end thereof is connected to the edge 124b of the main electrode portion 24a. The exposed one end of the lead portion 24b is electrically and mechanically connected to the second connection electrode 13. The other end of the lead portion 24b is connected to the middle portion 116 of the main electrode portion 24a when viewed from the opposing direction of the third and fourth side faces 8, 9. The width W6 of the one end of the lead portion 24b is equal to the width W4 of the one end of the lead portion 22b.

In the multilayer capacitor C1 of the first embodiment having the above configuration, the first internal electrode 21 includes the lead portions 21a, 21b and the second internal electrode 22 includes the lead portions 22a, 22b. The widths W1-W4 of the one ends of the lead portions 21a, 21b, 22a, 22b are not more than the widths W5, W6 of the one ends of the lead portions 23b, 24b in the third and fourth internal electrodes 23, 24. Therefore, each electric current path has a narrowed portion in the width of the path, which increases the ESR. In the first embodiment, the widths W1, W3 of the one ends of the lead portions 21a, 22a are smaller than the widths W2, W4 of the one ends of the lead portions 21b, 22b. When the lead portions 21a, 22a connected to the first and second terminal electrodes 10, 11 are made narrower as in this case, the ESR is further increased.

The main electrode portions 23a, 24a of the third and fourth internal electrodes 23, 24 overlap each other when viewed from the laminating direction. In the third internal electrode 23, the joint portion between the main electrode portion 23a and the lead portion 23b agrees with the middle portion 16 of the main electrode portion 23a when viewed from the opposing direction of the third and fourth side faces 8, 9. In the fourth internal electrode 24, the joint portion between the main electrode portion 24a and the lead portion 24b agrees with the middle portion 116 of the main electrode portion 24a when viewed from the opposing direction of the third and fourth side faces 8, 9. The lead portion 23b and the lead portion 24b are in a state in which they are opposed to each other in the middle portions of the main electrode portions 23a, 24a when viewed from the laminating direction. Since the lead portions are in this positional relation, a direction of an electric current flowing through the end portion 14 or 15 of the main electrode portion 23a becomes opposite to a direction of an electric current flowing through the end portion 114 or 115 of the main electrode portion 24a. As a consequence, magnetic fields caused by electric currents cancel each other out in part in the third internal electrodes 23 and in the fourth internal electrodes 24, which can decrease the ESL of the multilayer capacitor C1. Arrows in FIGS. 3 to 5 indicate directions of electric currents in a case where the first terminal electrode 10 is a positive electrode and the second terminal electrode 11 a negative electrode.

In the multilayer capacitor C1, the first and second internal electrodes 21, 22 are located outside the third and fourth internal electrodes 23, 24. It is common practice to subject the laminate body 1 to barrel polishing before formation of the external electrodes, and the ridge portions of the laminate body 1 are significantly affected by the barrel polishing. In the multilayer capacitor C1, the first and second internal electrodes 21, 22 are provided relatively outside, whereby the lead portions 21a, 21b, 22a, 22b of the first and second internal electrodes 21, 22 are made closer to the ridge lines of the laminate body 1. Since the lead portions 21a, 21b, 22a, 22b located near the ridge lines are significantly affected by the barrel polishing, they are surely exposed. Although the multilayer capacitor C1 has the lead portions 21a, 21b, 22a, 22b relatively narrow as described above, these can be surely exposed. For this reason, it becomes feasible to make good contact between the first and second internal electrodes 21, 22 and the external electrodes.

The laminate body 1 has one each of the first and second internal electrodes 21, 22. Since there are only one internal electrode connected to the first terminal electrode 10 and only one internal electrode connected to the second terminal electrode 11, the ESR of the multilayer capacitor C1 can be further increased.

In the multilayer capacitor C1, the lead portion 21b of the first internal electrode 21 is directed from the center portion to the third side face 8 when viewed from the laminating direction. For this reason, as shown in FIGS. 4 and 5, directions of electric currents are opposite to each other in the lead portion 21b and in the middle portion 116 of the main electrode portion 24a. As a consequence, magnetic fields caused by the electric currents cancel each other out in part in the first internal electrode 21 and in the fourth internal electrode 24. The lead portion 22b of the second internal electrode 22 is directed from the center portion to the fourth side face 9 when viewed from the laminating direction. For this reason, directions of electric currents become opposite to each other in the lead portion 22b and in the middle portion 16 of the main electrode portion 23a. As a consequence, magnetic fields caused by the electric currents cancel each other out in part in the second internal electrode 22 and in the third internal electrode 23. Since the cancellation of magnetic fields occurs between the first internal electrode 21 and the fourth internal electrode 24 and between the second internal electrode 22 and the third internal electrode 23 as described above, the ESL of the multilayer capacitor C1 can be further decreased.

Figure 6:
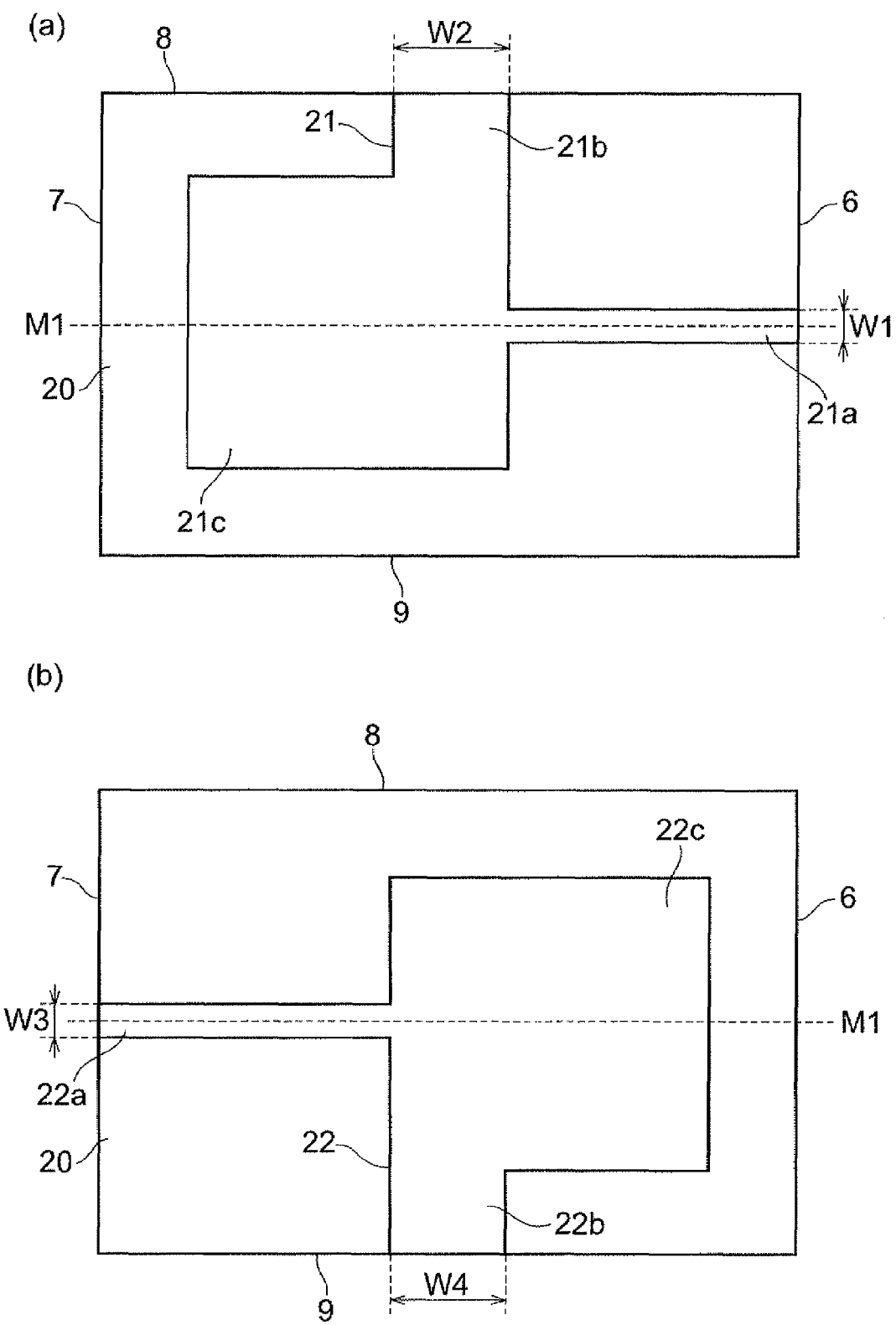
FIG. 6 is a drawing showing first and second internal electrodes in a multilayer capacitor according to a modification example of the first embodiment.

The following will describe a modification example of the first embodiment, based on FIG. 6. FIG. 6(a) is a drawing showing the first internal electrode in the multilayer capacitor according to the modification example of the first embodiment and FIG. 6(b) a drawing showing the second internal electrode in the multilayer capacitor. FIG. 6 shows a state before barrel polishing.

Just as the multilayer capacitor C1 of the first embodiment has, the multilayer capacitor of the present modification example has the laminate body 1, the first terminal electrode 10 and second terminal electrode 11 disposed on the exterior surface of the laminate body 1, and the first connection electrode 12 and second connection electrode 13 disposed on the exterior surface of the laminate body 1, which are not shown herein. The multilayer capacitor of the present modification example is different in the shapes of the first and second internal electrodes 21, 22 from that of the first embodiment. The shapes of the first and second internal electrodes 21, 22 will be described below in detail.

The first internal electrode 21 in the present modification example consists of two lead portions 21a, 21b. The lead portion 21b, as shown in FIG. 6(a), includes one end and the other end 21c. The one end of the lead portion 21b is exposed from the third side face 8. The width W2 of the one end of the lead portion 21b is equal to the width W5 of the one end of the lead portion 23b. The width of the other end 21c is larger than the width W2 of the one end of the lead portion 21b. The other end 21c is opposed to the main electrode portion 24a of the fourth internal electrode 24 in the laminating direction. More specifically, the other end 21c, when viewed from the laminating direction, overlaps with the middle portion 116 and end portion 115 of the main electrode portion 24a. The lead portion 21a is located on the center line M1 so that one end thereof is exposed from the first side face 6 and the other end is connected to the other end 21c of the lead portion 21b. The width W1 of the one end of the lead portion 21a is smaller than the width W2 of the one end of the lead portion 21b.

The second internal electrode 22 in the present modification example consists of two lead portions 22a, 22b. The lead portion 22b, as shown in FIG. 6(b), includes one end and the other end 22c. The one end of the lead portion 22b is exposed from the fourth side face 9. The width W4 of the one end of the lead portion 22b is equal to the width W6 of the one end of the lead portion 24b. The width of the other end 22c is larger than the width W4 of the one end of the lead portion 22b. The other end 22c is opposed to the main electrode portion 23a of the third internal electrode 23 in the laminating direction. More specifically, the other end 22c, when viewed from the laminating direction, overlaps with the middle portion 16 and end portion 14 of the main electrode portion 23a. The lead portion 22a is located on the center line M1 so that one end thereof is exposed from the second side face 7 and the other end thereof is connected to the other end 22c of the lead portion 22b. The width W3 of the one end of the lead portion 22a is smaller than the width W4 of the one end of the lead portion 22b.

In the multilayer capacitor of this configuration, it becomes feasible to increase the ESR, without increase in ESL, while ensuring good contact between the internal electrodes and the terminal electrodes, for the same reason as with the multilayer capacitor C1 of the first embodiment. A capacitance is formed between the other end 21c of the first internal electrode 21 and the main electrode portion 24a of the fourth internal electrode 24 and a capacitance is formed between the other end 22c of the second internal electrode 22 and the main electrode portion 23a of the third internal electrode 23; therefore, the capacitance of the multilayer capacitor is increased.

Figure 7:
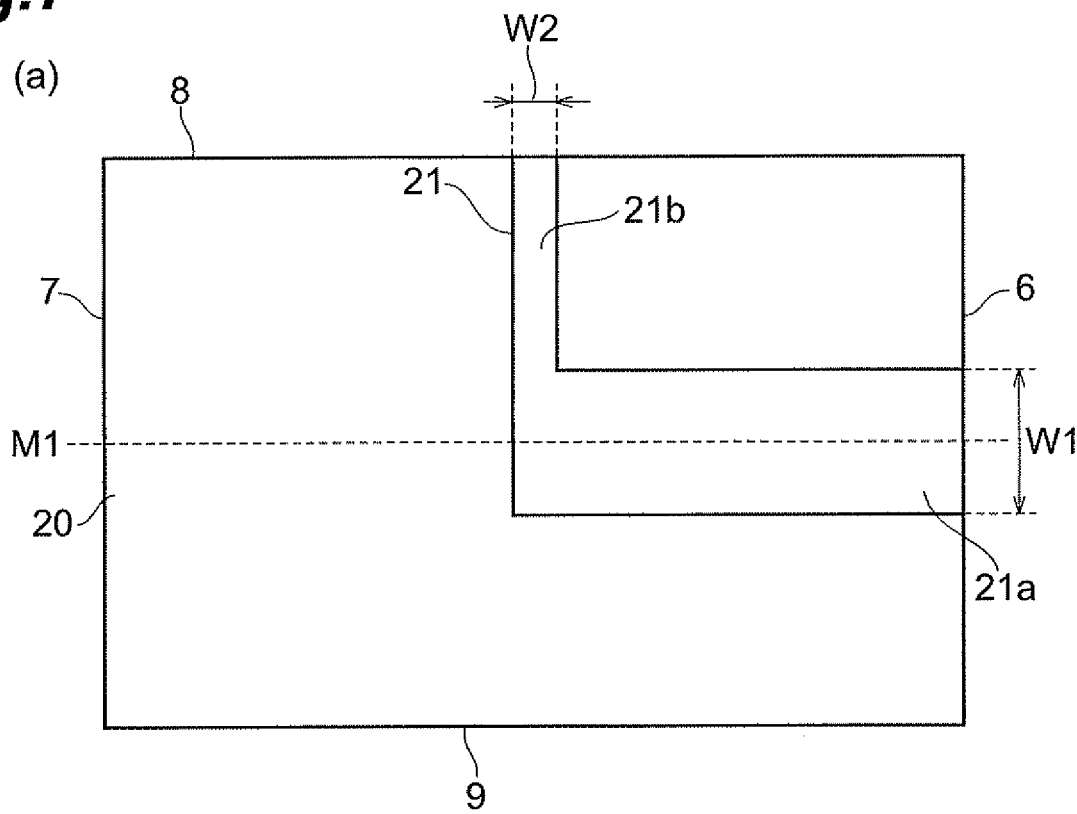
FIG. 7 is a drawing showing first and second internal electrodes in a multilayer capacitor according to another modification example of the first embodiment.
Figure 7:
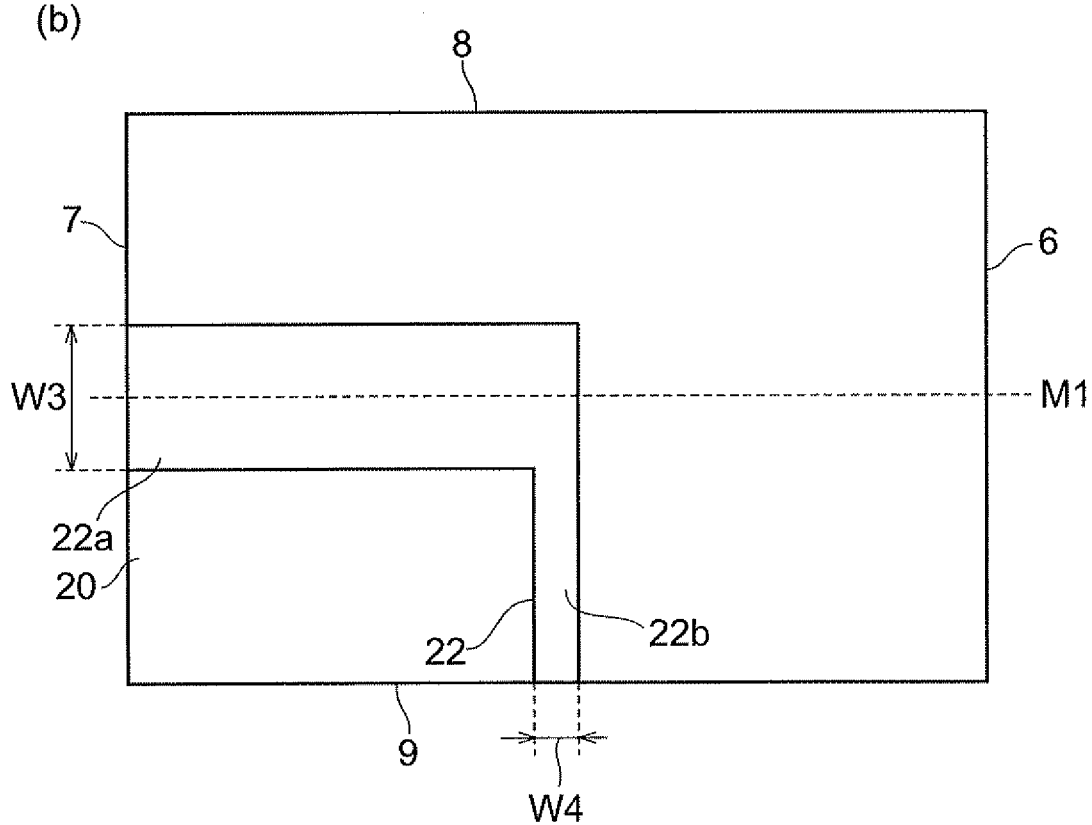

Another modification example of the first embodiment will be described based on FIG. 7. FIG. 7(a) is a drawing showing the first internal electrode in the multilayer capacitor according to the other modification example of the first embodiment and FIG. 7(b) a drawing showing the second internal electrode in the multilayer capacitor. FIG. 7 shows a state before barrel polishing.

Just as the multilayer capacitor C1 of the first embodiment has, the multilayer capacitor of the present modification example has the laminate body 1, the first terminal electrode 10 and second terminal electrode 11 disposed on the exterior surface of the laminate body 1, and the first connection electrode 12 and second connection electrode 13 disposed on the exterior surface of the laminate body 1, which are not shown herein. The multilayer capacitor of the present modification example is different in the widths of the first and second internal electrodes 21, 22 from that of the first embodiment. The widths of the first and second internal electrodes 21, 22 will be described below in detail.

As shown in FIG. 7(a), the first internal electrode 21 of the present modification example consists of two lead portions 21a, 21b. When viewed from the laminating direction, the lead portion 21a is located on the center line M1 and extends from the center portion to the first side face 6. The lead portion 21b extends from the center portion to the third side face 8 and along the shorter-side direction of the first and second principal faces 4, 5. The width W1 of one end of the lead portion 21a is larger than the width W2 of one end of the lead portion 21b. However, the width W1 of the one end of the lead portion 21a is equal to or smaller than the width W5 of the one end of the lead portion 23b.

As shown in FIG. 7(b), the second internal electrode 22 of the present modification example consists of two lead portions 22a, 22b. When viewed from the laminating direction, the lead portion 22a is located on the center line M1 and extends from the center portion to the second side face 7. The lead portion 22b extends from the center portion to the fourth side face 9 and along the shorter-side direction of the first and second principal faces 4, 5. The width W3 of one end of the lead portion 22a is larger than the width W4 of one end of the lead portion 22b. However, the width W3 of the one end of the lead portion 22a is equal to or smaller than the width W6 of the one end of the lead portion 24b.

Since in the multilayer capacitor of this configuration the widths W1-W4 of the one ends of the lead portions 21a, 21b, 22a, 22b are also not more than the widths W5, W6 of the one ends of the lead portions 23b, 24b in the third and fourth internal electrodes 23, 24, each electric current path has a narrowed portion in the width of the path, which increases the ESR. For the same reason as with the multilayer capacitor C1 of the first embodiment, it becomes feasible to suppress increase in ESL, while ensuring good contact between the internal electrodes and the terminal electrodes.

Figure 8:
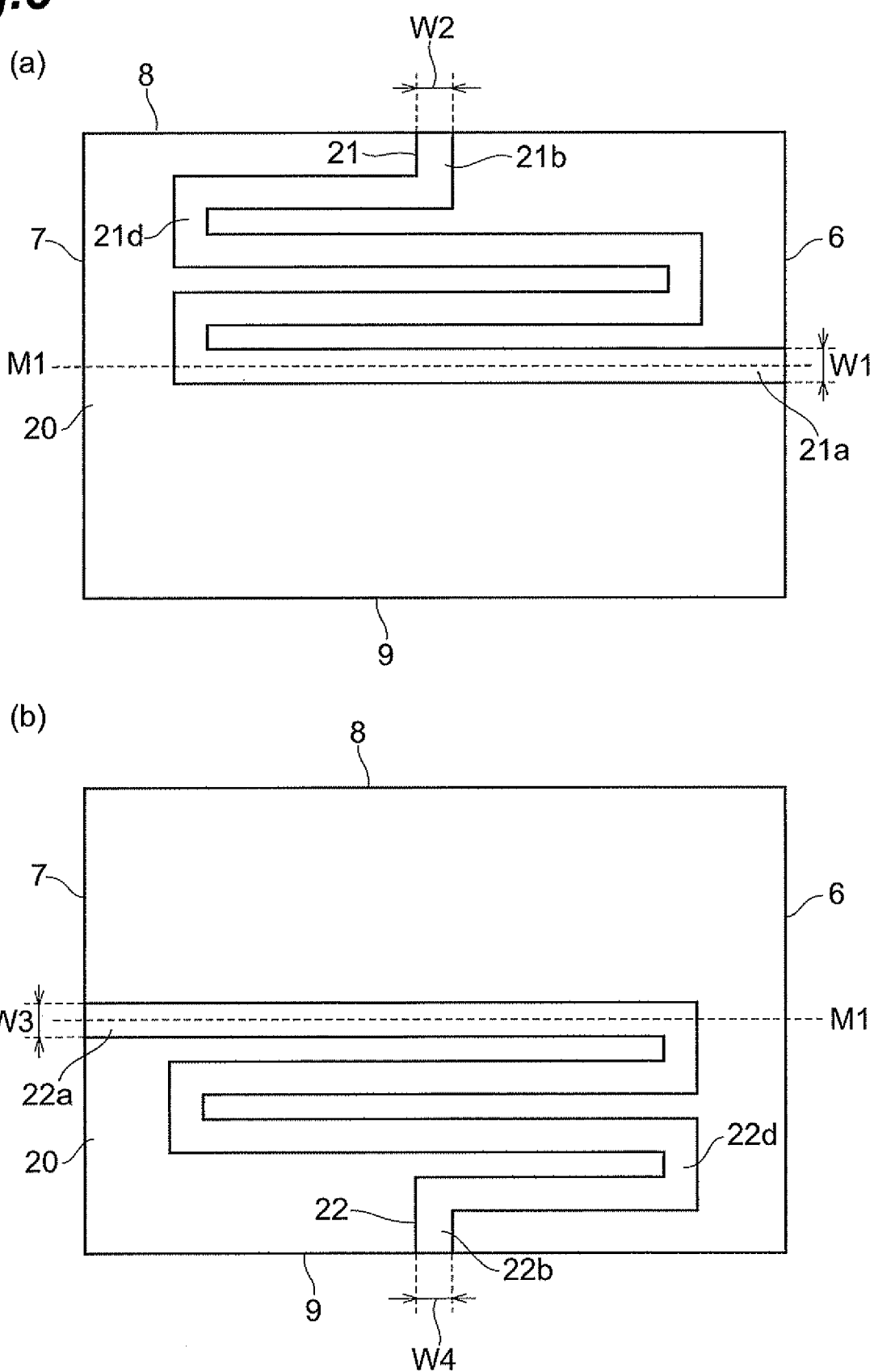
FIG. 8 is a drawing showing first and second internal electrodes in a multilayer capacitor according to still another modification example of the first embodiment.

Still another modification example of the first embodiment will be described below based on FIG. 8. FIG. 8(a) is a drawing showing the first internal electrode in the multilayer capacitor according to the other modification example of the first embodiment and FIG. 8(b) a drawing showing the second internal electrode in the multilayer capacitor. FIG. 8 shows a state before barrel polishing.

Just as the multilayer capacitor C1 of the first embodiment has, the multilayer capacitor of the present modification example has the laminate body 1, the first terminal electrode 10 and second terminal electrode 11 disposed on the exterior surface of the laminate body 1, and the first connection electrode 12 and second connection electrode 13 disposed on the exterior surface of the laminate body 1, which are not shown herein. The multilayer capacitor of the present modification example is different in the shapes of the first and second internal electrodes 21, 22 from that of the first embodiment. The shapes of the first and second internal electrodes 21, 22 will be described below in detail.

As shown in FIG. 8(a), the first internal electrode 21 in the present modification example includes a connection portion 21d in addition to two lead portions 21a, 21b. The connection portion 21d is of a meander shape. The lead portion 21a is connected to one end of the connection portion 21d. The lead portion 21a is located on the center line M1 and extends to the first side face 6. The lead portion 21b is connected to the other end of the connection portion 21d and extends to the third side face 8. The width W1 of one end of the lead portion 21a, the width W2 of one end of the lead portion 21b, and the width of the connection portion 21d are equal to each other, and these widths are smaller than the width W5 of the one end of the lead portion 23b.

As shown in FIG. 8(b), the second internal electrode 22 in the present modification example includes a connection portion 22d in addition to two lead portions 22a, 22b. The connection portion 22d is of a meander shape. The lead portion 22a is connected to one end of the connection portion 22d. The lead portion 22a is located on the center line M1 and extends to the second side face 7. The lead portion 22b is connected to the other end of the connection portion 22d and extends to the fourth side face 9. The width W3 of one end of the lead portion 22a, the width W4 of one end of the lead portion 22b, and the width of the connection portion 22d are equal to each other, and these widths are smaller than the width W6 of the one end of the lead portion 24b.

Since in the multilayer capacitor of this configuration the widths W1-W4 of the one ends of the lead portions 21a, 21b, 22a, 22b are also not more than the widths W5, W6 of the one ends of the lead portions 23b, 24b in the third and fourth internal electrodes 23, 24, each electric current path has a narrowed portion in the width of the path. As a consequence, the ESR increases. Since the first and second internal electrodes include the connection portions 21d, 22d of the meander shape, the current paths become longer, so as to further increase the ESR. For the same reason as with the multilayer capacitor C1 of the first embodiment, it becomes feasible to suppress increase in ESL, while ensuring good contact between the interns electrodes and the terminal electrodes.

Figure 9:
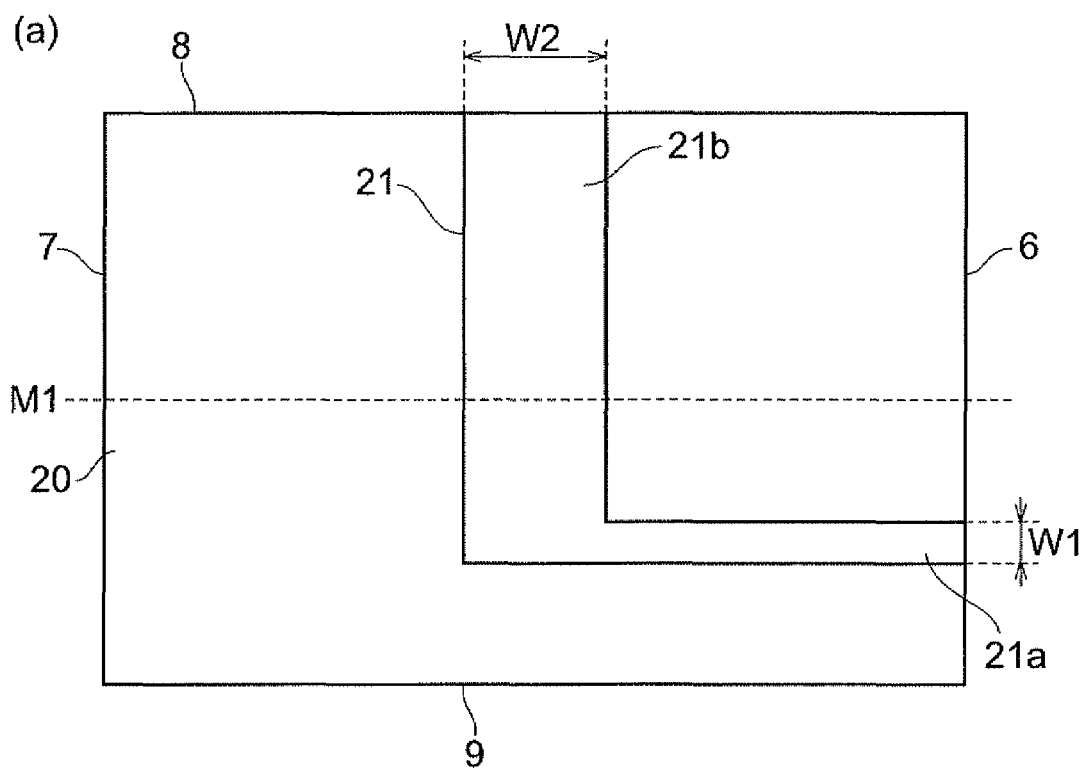
FIG. 9 is a drawing showing first and second internal electrodes in a multilayer capacitor according to still another modification example of the first embodiment.
Figure 9:
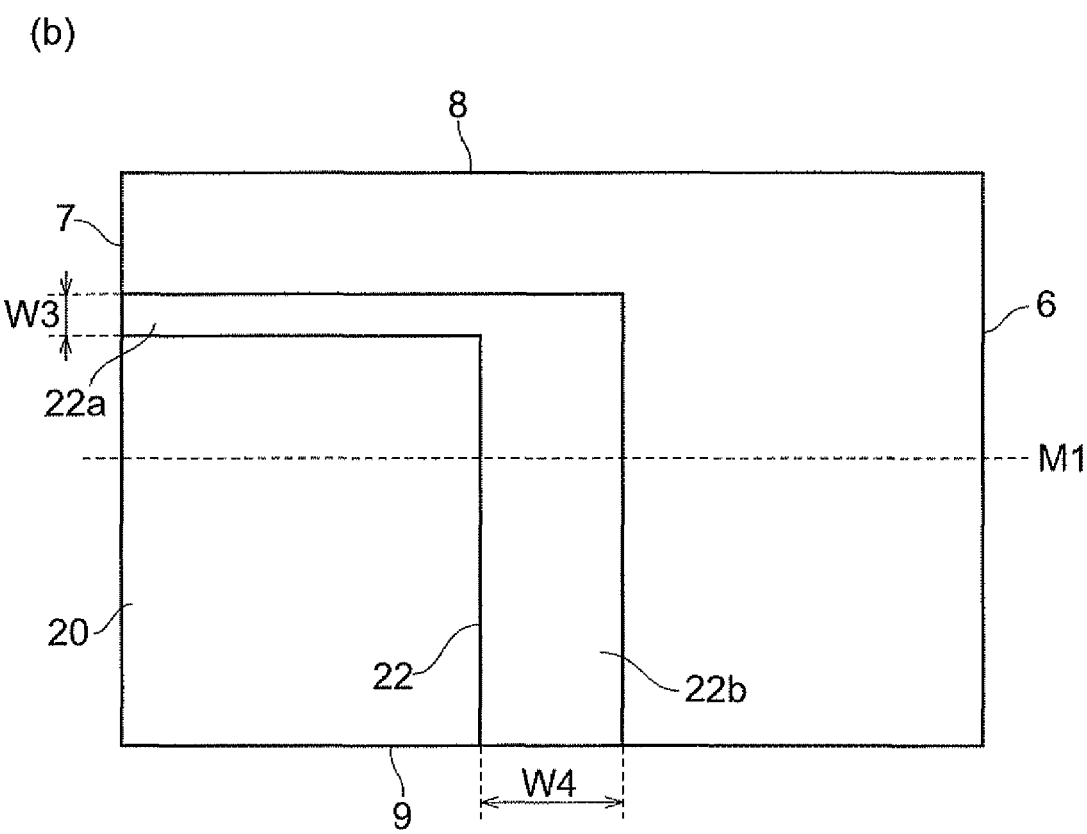

Still another modification example of the first embodiment will be described below based on FIG. 9. FIG. 9(a) is a drawing showing the first internal electrode in the multilayer capacitor according to the other modification example of the first embodiment and FIG. 9(b) a drawing showing the second internal electrode in the multilayer capacitor. FIG. 9 shows a state before barrel polishing.

Just as the multilayer capacitor C1 of the first embodiment, the multilayer capacitor of the present modification example has the laminate body 1, the first terminal electrode 10 and second terminal electrode 11 disposed on the exterior surface of the laminate body 1, and the first connection electrode 12 and second connection electrode 13 disposed on the exterior surface of the laminate body 1, which are not shown. The multilayer capacitor of the present modification example is different in the positions of the first and second internal electrodes 21, 22 from that of the first embodiment. The positions of the first and second internal electrodes 21, 22 will be described below in detail.

As shown in FIG. 9(a), the first internal electrode 21 in the present modification example consists of two lead portions 21a, 21b. When viewed from the laminating direction, one end of the lead portion 21a is exposed from a position nearer to the fourth side face 9 in the first side face 6. More specifically, the lead portion 21a, when viewed from the laminating direction, extends along the longer-side direction of the first and second principal faces 4, 5 and between the longer side of the first and second principal faces 4, 5 located on the fourth side face 9 side, and the center line M1. The lead portion 21b is coupled to the lead portion 21a and extends along the shorter-side direction of the first and second principal faces 4, 5. The width W1 of the one end of the lead portion 21a is smaller than the width W2 of the one end of the lead portion 21b and the width W2 of the one end of the lead portion 21b is equal to the width W5 of the one end of the lead portion 23b.

As shown in FIG. 9(b), the second internal electrode 22 in the present modification example consists of two lead portions 22a, 22b. When viewed from the laminating direction, one end of the lead portion 22a is exposed from a position nearer to the third side face 8 in the second side face 7. More specifically, the lead portion 22a, when viewed from the laminating direction, extends along the longer-side direction of the first and second principal faces 4, 5 and between the longer side of the first and second principal faces 4, 5 located on the third side face 8 side, and the center line M1. The lead portion 22b is coupled to the lead portion 22a and extends along the shorter-side direction of the first and second principal faces 4, 5. The width W3 of the one end of the lead portion 22a is smaller than the width W4 of the one end of the lead portion 22b and the width W4 of the one end of the lead portion 22b is equal to the width W6 of the one end of the lead portion 24b.

In the multilayer capacitor having the first and second internal electrodes 21, 22 as described above, each electric current path has a narrowed portion in the width of the path, which increases the ESR. Since the lead portions 21a, 22a connected to the first and second terminal electrodes 10, 11 are made further narrower, the ESR can be further increased. For the same reason as with the multilayer capacitor C1 of the first embodiment, it becomes feasible to suppress increase in ESL.

When viewed from the laminating direction, the one end of the lead portion 21a is located nearer to the fourth side face 9 and the one end of the lead portion 22a is located nearer to the third side face 8. For this reason, the one end of the lead portion 21a is located near the ridge line made by the first and fourth side faces 6, 9 and the one end of the lead portion 22a is located near the ridge line made by the second and third side faces 7, 8. In the multilayer capacitor of the present modification example as described above, the one ends of the lead portions 21a, 22a are located near the ridge lines, whereby these can be surely exposed by barrel polishing. As a consequence, good contact can be made between the first and second internal electrodes 21, 22 and the first and second terminal electrodes 10, 11.

The first and second internal electrodes 21, 22 in the present modification example do not always have to be the outermost layers among the internal electrodes. In the first and second internal electrodes 21, 22 of the present modification example, the positions of the lead portions 21a, 22a are shifted from the center line M1. Therefore, even if the first and second internal electrodes 21, 22 are located in the middle in the laminating direction, the one end of the lead portion 21a is always located near the ridge line made by the first and fourth side faces 6, 9 and the one end of the lead portion 22a is always located near the ridge line made by the second and third side faces 7, 8. Therefore, good contact can be made between the first and second internal electrodes 21, 22 and the first and second terminal electrodes 10, 11, irrespective of the positions in the laminating direction of the first and second internal electrodes 21, 22.

The one end of the lead portion 21a may be located nearer to the third side face 8. However, the total length of the lead portions 21a, 21b becomes longer and the ESR is thus larger when the one end of the lead portion 21a is located nearer to the fourth side face 9 as in the present example. Likewise, the one end of the lead portion 22a may also be located nearer to the fourth side face 9, but the ESR is larger in the configuration of the present example.

Figure 10:
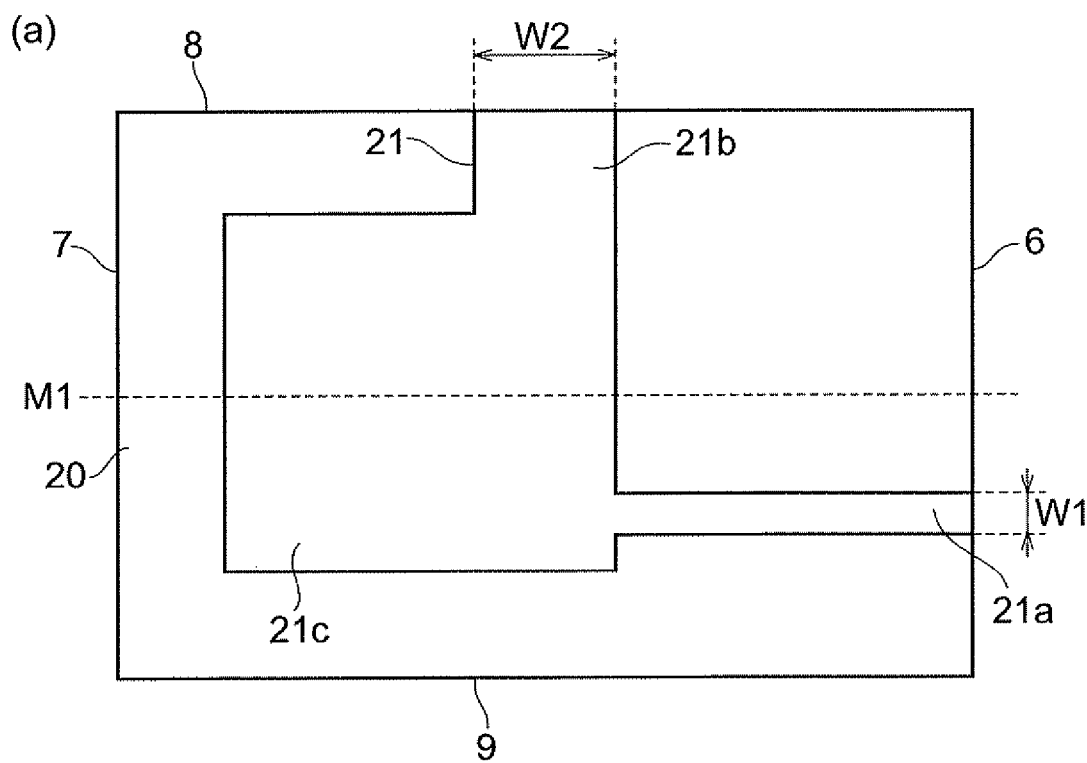
FIG. 10 is a drawing showing first and second internal electrodes in a multilayer capacitor according to still another modification example of the first embodiment.
Figure 10:
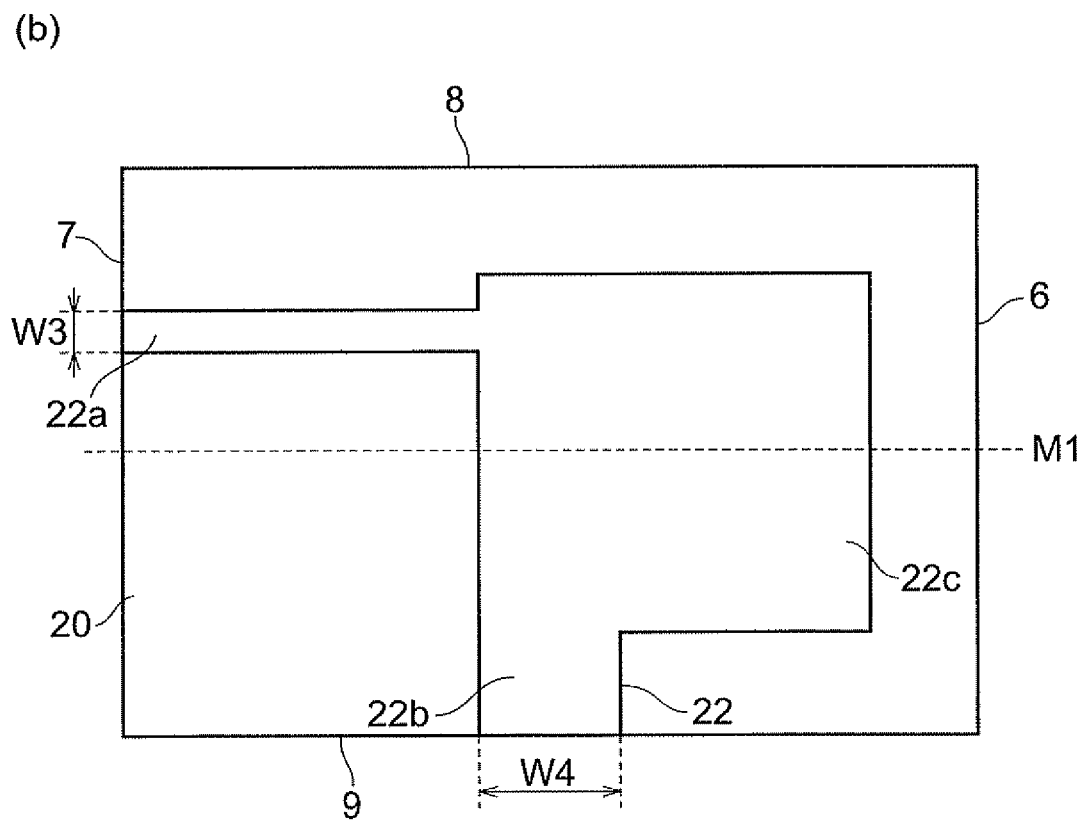

Still another modification example of the first embodiment will be described below based on FIG. 10. FIG. 10(a) is a drawing showing the first internal electrode in the multilayer capacitor according to the other modification example of the first embodiment and FIG. 10(b) a drawing showing the second internal electrode in the multilayer capacitor. FIG. 10 shows a state before barrel polishing.

Just as the multilayer capacitor C1 of the first embodiment has, the multilayer capacitor of the present modification example has the laminate body 1, the first terminal electrode 10 and second terminal electrode 11 disposed on the exterior surface of the laminate body 1, and the first connection electrode 12 and second connection electrode 13 disposed on the exterior surface of the laminate body 1, which are not shown herein. The multilayer capacitor of the present modification example is different in the shapes of the first and second internal electrodes 21, 22 from that of the first embodiment. The shapes of the first and second internal electrodes 21, 22 will be described below in detail.

The first internal electrode 21 of the present modification example consists of two lead portions 21a, 21b. The lead portion 21b, as shown in FIG. 10(a), includes one end and the other end 21c. The one end of the lead portion 21b is exposed from the third side face 8. The width W2 of the one end of the lead portion 21b is equal to the width W5 of the one end of the lead portion 23b. The width of the other end 21c is larger than the width W2 of the one end of the lead portion 21b. The other end 21c is opposed to the main electrode portion 24a of the fourth internal electrode 24 in the laminating direction. More specifically, the other end 21c, when viewed from the laminating direction, overlaps with the middle portion 116 and end portion 115 of the main electrode portion 24a. The lead portion 21a extends along the longer-side direction of the first and second principal faces 4, 5 and between the longer side of the first and second principal faces 4, 5 located on the fourth side face 9 side, and the center line M1. The one end of the lead portion 21a is exposed from the first side face 6 and the other end is connected to the other end 21c of the lead portion 21b. The width W1 of the one end of the lead portion 21a is smaller than the width W2 of the one end of the lead portion 21b.

The second internal electrode 22 in the present modification example consists of two lead portions 22a, 22b. The lead portion 22b, as shown in FIG. 10(b), includes one end and the other end 22c. The one end of the lead portion 22b is exposed from the fourth side face 9. The width W4 of the one end of the lead portion 22b is equal to the width W6 of the one end of the lead portion 24b. The width of the other end 22c is larger than the width W4 of the one end of the lead portion 22b. The other end 22c is opposed to the main electrode portion 23a of the third internal electrode 23 in the laminating direction. More specifically, the other end 22c, when viewed from the laminating direction, overlaps with the middle portion 16 and end portion 14 of the main electrode portion 23a. The lead portion 22a extends along the longer-side direction of the first and second principal faces 4, 5 and between the longer side of the first and second principal faces 4, 5 located on the third side face 8 side, and the center line M1. The one end of the lead portion 22a is exposed from the second side face 7 and the other end thereof is connected to the other end 22c of the lead portion 22b. The width W3 of the one end of the lead portion 22a is smaller than the width W4 of the one end of the lead portion 22b.

In the multilayer capacitor of this configuration, it also becomes feasible to increase the ESR, without increase in ESL, while ensuring good contact between the internal electrodes and the terminal electrodes, for the same reason as with the multilayer capacitor C1 of the first embodiment. A capacitance is formed between the other end 21c and the main electrode portion 24a and a capacitance is formed between the other end 22c and the main electrode portion 23a; therefore, the capacitance of the multilayer capacitor becomes larger Since the one ends of the lead portions 21a, 22a are located as shifted from the center line M1, they can be surely exposed during the barrel polishing and it becomes feasible to ensure better contact between the internal electrodes and the terminal electrodes.

Figure 11:
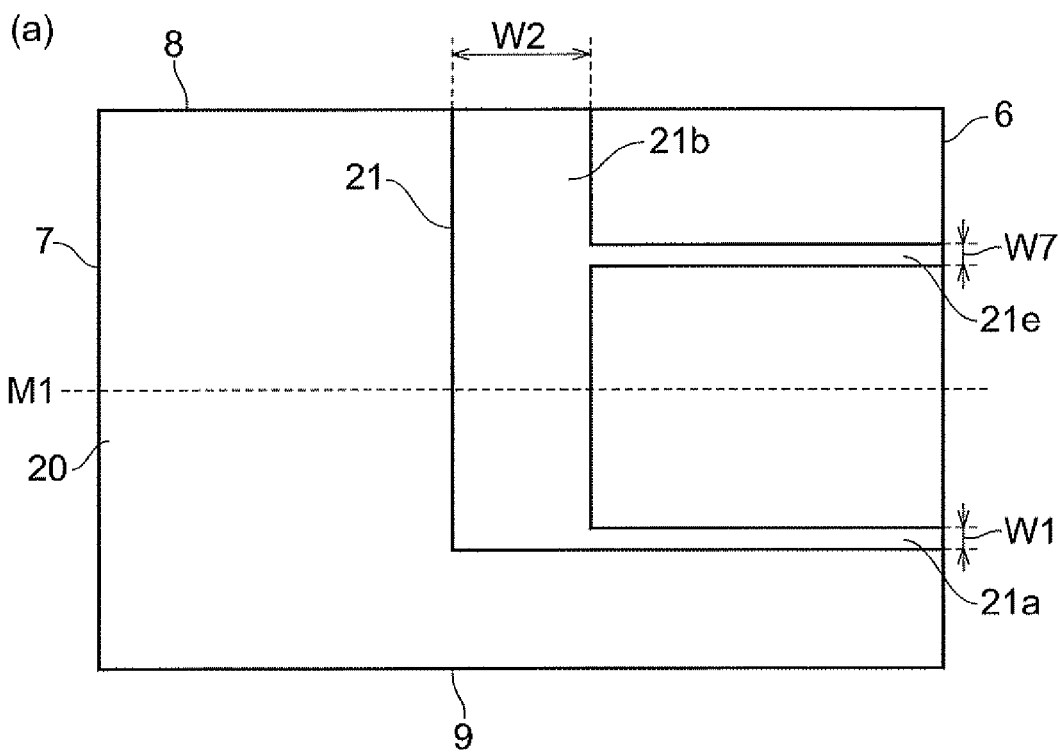
FIG. 11 is a drawing showing first and second internal electrodes in a multilayer capacitor according to still another modification example of the first embodiment.
Figure 11:
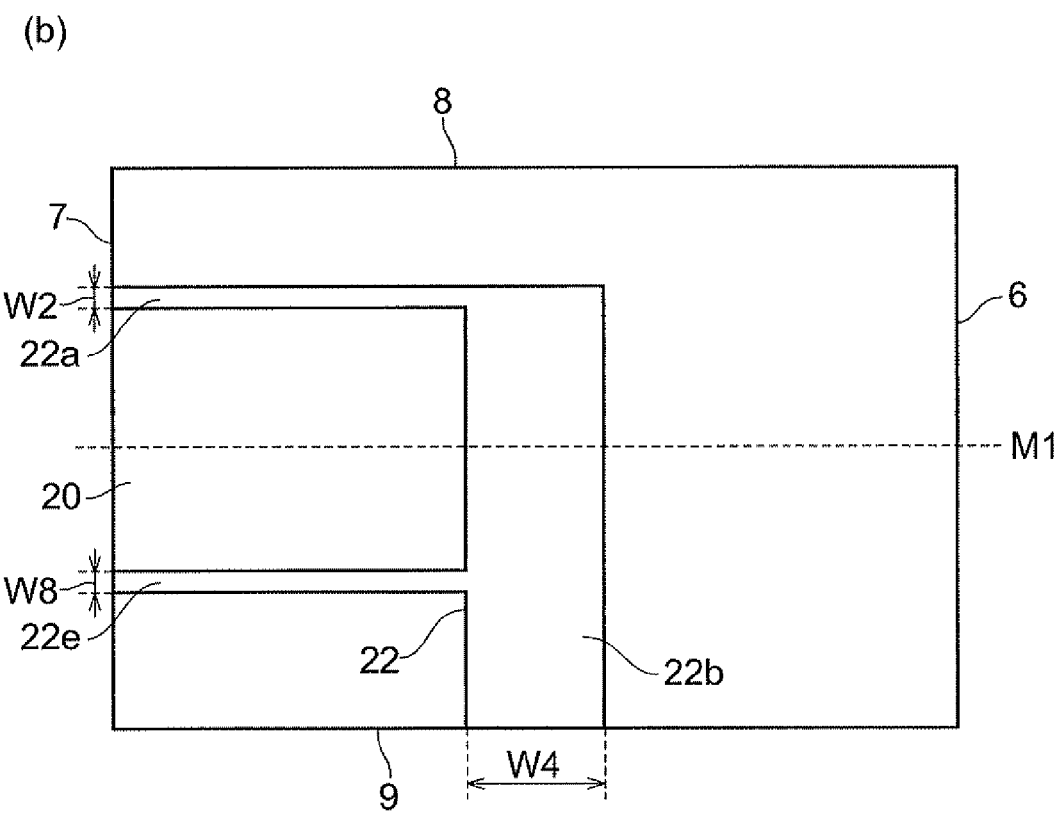

Still another modification example of the first embodiment will be described below based on FIG. 11. FIG. 11(a) is a drawing showing the first internal electrode in the multilayer capacitor according to the other modification example of the first embodiment and FIG. 11(b) a drawing showing the second internal electrode in the multilayer capacitor. FIG. 11 shows a state before barrel polishing.

Just as the multilayer capacitor C1 of the first embodiment has, the multilayer capacitor of the present modification example has the laminate body 1, the first terminal electrode 10 and second terminal electrode 11 disposed on the exterior surface of the laminate body 1, and the first connection electrode 12 and second connection electrode 13 disposed on the exterior surface of the laminate body 1, which are not shown herein. The multilayer capacitor of the present modification example is different in the shapes of the first and second internal electrodes 21, 22 from that of the first embodiment. The shapes of the first and second internal electrodes 21, 22 will be described below in detail.

As shown in FIG. 11(a), the first internal electrode 21 in the present modification example consists of three lead portions 21a, 21b, 21e. The lead portion 21a extends along the longer-side direction of the first and second principal faces 4, 5 and between the longer side of the first and second principal faces 4, 5 located on the fourth side face 9 side, and the center line M1. The lead portion 21b extends along the shorter-side direction of the first and second principal faces 4, 5. The lead portion 21e extends along the longer-side direction of the first and second principal faces 4, 5 and between the longer side of the first and second principal faces 4, 5 located on the third side face 8 side, and the center line M1. One end of the lead portion 21e is exposed from the first side face 6 and the other end thereof is connected to the lead portion 21b.

The width W1 of the one end of the lead portion 21a and the width W7 of the one end of the lead portion 21e are smaller than the width W2 of the one end of the lead portion 21b. The width W2 of the one end of the lead portion 21b is equal to the width W5 of the one end of the lead portion 23b.

As shown in FIG. 11(b), the second internal electrode 22 in the present modification example consists of three lead portions 22a, 22b, 22e. The lead portion 22a extends along the longer-side direction of the first and second principal faces 4, 5 and between the longer side of the first and second principal faces 4, 5 located on the third side face 8 side, and the center line M1. The lead portion 22b extends along the shorter-side direction of the first and second principal faces 4, 5. The lead portion 22e extends along the longer-side direction of the first and second principal faces 4, 5 and between the longer side of the first and second principal faces 4, 5 located on the fourth side face 9, and the center line M1. One end of the lead portion 22e is exposed from the second side face 7 and the other end thereof is connected to the lead portion 22b.

The width W2 of the one end of the lead portion 22a and the width W8 of the one end of the lead portion 22e are smaller than the width W4 of the one end of the lead portion 22b. The width W4 of the one end of the lead portion 22b is equal to the width W6 of the one end of the lead portion 23b.

In the multilayer capacitor of this configuration, it is feasible to increase the ESR, without increase in ESL, for the same reason as with the multilayer capacitor C1 of the first embodiment. Since the one ends of the lead portions 21a, 21e, 22a, 22e are located as shifted from the center line M1, these can be surely exposed during the barrel polishing and it is thus feasible to ensure good contact between the internal electrodes and the terminal electrodes. The two lead portions 21a, 21e of the first internal electrode 21 are connected to the first terminal electrode 10 and the two lead portions 22a, 22e of the second internal electrode 22 are connected to the second terminal electrode 11. For this reason, better contact can be made between the first and second internal electrodes 21, 22 and the first and second terminal electrodes 10, 11.

The widths W1, W7 of the one ends of the lead portions 21a, 21e are preferably approximately half of the width W1 of the one end of the lead portion 21a in the first embodiment. Similarly, the widths W2, W8 of the one ends of the lead portions 22a, 22e are preferably approximately half of the width W2 of the one end of the lead portion 22a in the first embodiment.

Second Embodiment

FIG. 12 is a sectional view of a multilayer capacitor according to the second embodiment. The multilayer capacitor C2 of the second embodiment has the laminate body 1, first terminal electrode 10 and second terminal electrode 11 disposed on the exterior surface of the laminate body 1, and first connection electrode 12 and second connection electrode 13 disposed on the exterior surface of the laminate body 1 just as the multilayer capacitor C1 of the first embodiment does. The multilayer capacitor C2 has much the same configuration as the multilayer capacitor C1 of the first embodiment, but is different from the multilayer capacitor C1 in that there are two layers of each of the third and fourth internal electrodes 23, 24.

In the multilayer capacitor C2, as shown in FIG. 12, the distance L1 between the first internal electrode 21 and the fourth internal electrode 24 adjacent to the first internal electrode 21 with the insulator layer 20 in between is larger than the distance L2 between the third internal electrode 23 and the fourth internal electrode 24 adjacent thereto with the insulator layer 20 in between. Furthermore, the distance L3 between the second internal electrode 22 and the third internal electrode 23 adjacent to the second internal electrode 22 with the insulator layer 20 in between is larger than the distance L2 between the third internal electrode 23 and the fourth internal electrode 24 adjacent thereto with the insulator layer 20 in between.

More specifically, the insulator layer 20 is laid in the thickness of L1 between the first internal electrode 21 and the fourth internal electrode 24 located nearest to the first internal electrode 21. The insulator layer 20 is laid in the thickness of L2 between the fourth internal electrode 24 and the third internal electrode 23 located nearest to the fourth internal electrode 24. The insulator layer 20 is laid in the thickness of L3 between the second internal electrode 22 and the third internal electrode 23 located nearest to the second internal electrode 22. L1 and L3 are larger than L2.

In the multilayer capacitor C2 of this configuration, the distance is large between the first internal electrode 21 and the fourth internal electrode 24 and between the second internal electrode 22 and the third internal electrode 23. Therefore, the first and second internal electrodes 21, 22 are located in further outer layers in the laminate body 1. The lead portion 21a of the first internal electrode 21 becomes much closer to the ridge line made by the second principal face 5 and the first side face 6 and the lead portion 21b becomes much closer to the ridge line made by the second principal face 5 and the third side face 8. The lead portion 22a of the second internal electrode 22 becomes much closer to the ridge line made by the second principal face 5 and the second side face 7 and the lead portion 22b becomes much closer to the ridge line made by the second principal face 5 and the fourth side face 9. Therefore, the lead portions 21a, 21b, 22a, 22b can be exposed more surely by the barrel polishing, whereby better contact can be made between the lead portions 21a, 22a and the first and second terminal electrodes 10, 11. When the widths W1, W3 of the one ends of the lead portions 21a, 22a are small, the resistance of the first and second internal electrodes 21, 22 increases to raise the concern of generation of heat due to ripple current. However, a gap is made by the insulator layer 20 between the first and second internal electrodes 21, 22 and the third and fourth internal electrodes 23, 24, which can enhance radiation of heat from the first and second internal electrodes 21, 22. This can prevent the multilayer capacitor 2 from becoming hot due to the generation of heat in the first and second internal electrodes 21, 22.

The multilayer capacitor C2 can be constructed using the first and second internal electrodes 21, 22 selected from those shown in FIGS. 4, and 6-11.

The above explained the preferred embodiments of the present invention, but it should be noted that the present invention does not always have to be limited to the above embodiments but can be modified in various ways without departing from the spirit and scope of the invention.

For example, the above embodiments showed the laminate body of the rectangular parallelepiped shape, but the shape of the laminate body is not limited to it. The first and second main electrodes were of the rectangular shape, but the shape of the first and second main electrodes is not limited to it.

The above embodiments showed the configuration wherein the main electrode portion 23a of the third internal electrode 23 and the main electrode portion 24a of the fourth internal electrode 24 overlapped throughout, but they may be arranged so as to overlap in portion.

The first embodiment showed the configuration wherein the widths W1, W3 of the one ends of the lead portions 21a, 22a were smaller than the widths W2, W4 of the one ends of the lead portions 21b, 22b, but the widths W1, W3 of the one ends of the lead portions 21a, 22a may be equal to the widths W2, W4 of the one ends of the lead portions 21b, 22b. However, the widths W1-W4 of the one ends of the lead portions 21a, 21b, 22a, 22b are not more than the widths W5, W6 of the one ends of the lead portions 23b, 24b.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising: a laminate body in which a plurality of internal electrodes are laminated with an insulator layer in between; and a plurality of external electrodes arranged on side faces of the laminate body and isolated from each other, wherein the laminate body has, as the internal electrodes, a first internal electrode, a second internal electrode arranged with a space in a laminating direction from the first internal electrode, and third and fourth internal electrodes arranged between the first internal electrode and the second internal electrode, and the first and second internal electrodes are located at outermost positions among the internal electrodes, wherein the laminate body has, as the side faces, first and second side faces extending along the laminating direction and facing each other, and third and fourth side faces extending along the laminating direction, extending along a direction intersecting with the first and second side faces, and facing each other, wherein the external electrodes include first and second terminal electrodes and first and second connection electrodes, wherein the first terminal electrode is arranged on the first side face, the second terminal electrode is arranged on the second side face, the first connection electrode is arranged on the third side face, and the second connection electrode is arranged on the fourth side face, wherein the first internal electrode includes:

a first lead portion extending so that one end thereof with a first width is exposed from the first side face, to be connected to the first terminal electrode; and a second lead portion connected to the first lead portion, and extending so that one end thereof with a second width is exposed from the third side face, to be connected to the first connection electrode, wherein the second internal electrode includes:

a third lead portion extending so that one end thereof with a third width is exposed from the second side face, to be connected to the second terminal electrode; and a fourth lead portion connected to the third lead portion, and extending so that one end thereof with a fourth width is exposed from the fourth side face, to be connected to the second connection electrode, wherein the third internal electrode includes:

a main electrode portion; and a fifth lead portion connected to an edge of said main electrode portion of the third internal electrode located on the third side face side, and extending so that one end thereof with a fifth width is exposed from the third side face, to be connected to the first connection electrode, wherein the fourth internal electrode includes:

a main electrode portion; and a sixth lead portion connected to an edge of said main electrode portion of the fourth internal electrode located on the fourth side face side, and extending so that one end thereof with a sixth width is exposed from the fourth side face, to be connected to the second connection electrode, wherein the main electrode portions of the third and fourth internal electrodes include respective capacitance forming regions which overlap each other when viewed from the laminating direction, wherein a joint portion between the main electrode portion and the fifth lead portion of the third internal electrode is located between an edge on the first side face side and an edge on the second side face side in the capacitance forming region when viewed from an opposing direction of the third and fourth side faces, wherein a joint portion between the main electrode portion and the sixth lead portion of the fourth internal electrode is located between an edge on the first side face side and an edge on the second side face side in the capacitance forming region when viewed from the opposing direction of the third and fourth side faces, and wherein each of the first to fourth widths is not more than the fifth and sixth widths.

2. The multilayer capacitor according to claim 1, wherein the first width is smaller than the second width and the third width is smaller than the fourth width.

3. The multilayer capacitor according to claim 1, wherein in the laminating direction, a distance between the first internal electrode and the third or fourth internal electrode adjacent to the first internal electrode with the insulator layer in between is larger than a distance between the third internal electrode and the fourth internal electrode adjacent to the third internal electrode with the insulator layer in between, and wherein in the laminating direction, a distance between the second internal electrode and the third or fourth internal electrode adjacent to the second internal electrode with the insulator layer in between is larger than the distance between the third internal electrode and the fourth internal electrode adjacent to the third internal electrode with the insulator layer in between.

4. The multilayer capacitor according to claim 1, wherein the laminate body has one each of the first and second internal electrodes.

5. The multilayer capacitor according to claim 1, wherein in the laminating direction, the first internal electrode is adjacent to the fourth internal electrode with the insulator layer in between and the second internal electrode is adjacent to the third internal electrode with the insulator layer in between.

6. The multilayer capacitor according to claim 5, wherein a width of the other end of the second lead portion is larger than the second width, wherein the other end of the second lead portion is connected to the other end of the first lead portion and opposed to the main electrode portion of the fourth internal electrode in the laminating direction, wherein a width of the other end of the fourth lead portion is larger than the fourth width, and wherein the other end of the fourth lead portion is connected to the other end of the third lead portion and opposed to the main electrode portion of the third internal electrode in the laminating direction.

7. A multilayer capacitor comprising: a laminate body in which a plurality of internal electrodes are laminated with an insulator layer in between; and a plurality of external electrodes arranged on side faces of the laminate body and isolated from each other, wherein the laminate body has first, second, third, and fourth internal electrodes as the internal electrodes, wherein the laminate body has, as the side faces, first and second side faces extending along a laminating direction and facing each other, and third and fourth side faces extending along a laminating direction, extending along a direction intersecting with the first and second side faces, and facing each other, wherein the external electrodes include first and second terminal electrodes and first and second connection electrodes, wherein the first terminal electrode is arranged on the first side face, the second terminal electrode is arranged on the second side face, the first connection electrode is arranged on the third side face, and the second connection electrode is arranged on the fourth side face, wherein the first internal electrode includes:

a first lead portion extending so that one end thereof with a first width is exposed from the first side face, to be connected to the first terminal electrode; and a second lead portion connected to the first lead portion, and extending so that one end thereof with a second width is exposed from the third side face, to be connected to the first connection electrode, wherein the second internal electrode includes:

a third lead portion extending so that one end thereof with a third width is exposed from the second side face, to be connected to the second terminal electrode; and a fourth lead portion connected to the third lead portion, and extending so that one end thereof with a fourth width is exposed from the fourth side face, to be connected to the second connection electrode, wherein the third internal electrode includes:

a main electrode portion; and a fifth lead portion connected to an edge of said main electrode portion of the third internal electrode located on the third side face side, and extending so that one end thereof with a fifth width is exposed from the third side face, to be connected to the first connection electrode, wherein the fourth internal electrode includes:

a main electrode portion; and a sixth lead portion connected to an edge of said main electrode portion of the fourth internal electrode located on the fourth side face side, and extending so that one end thereof with a sixth width is exposed from the fourth side face, to be connected to the second connection electrode, wherein the main electrode portions of the third and fourth internal electrodes include respective capacitance forming regions which overlap each other when viewed from the laminating direction, wherein a joint portion between the main electrode portion and the fifth lead portion of the third internal electrode is located between an edge on the first side face side and an edge on the second side face side in the capacitance forming region when viewed from an opposing direction of the third and fourth side faces, wherein a joint portion between the main electrode portion and the sixth lead portion of the fourth internal electrode is located between an edge on the first side face side and an edge on the second side face side in the capacitance forming region when viewed from the opposing direction of the third and fourth side faces, wherein each of the first to fourth widths is not more than the fifth and sixth widths, wherein, when viewed from the laminating direction, the one end of the first lead portion is exposed from a position nearer to the third side face or from a position nearer to the fourth side face in the first side face, and wherein, when viewed from the laminating direction, the one end of the third lead portion is exposed from a position nearer to the third side face or from a position nearer to the fourth side face in the second side face.

8. The multilayer capacitor according to claim 7, wherein the first width is smaller than the second width and the third width is smaller than the fourth width.

9. The multilayer capacitor according to claim 7, wherein in the laminating direction, a distance between the first internal electrode and the third or fourth internal electrode adjacent to the first internal electrode with the insulator layer in between is larger than a distance between the third internal electrode and the fourth internal electrode adjacent to the third internal electrode with the insulator layer in between, and wherein in the laminating direction, a distance between the second internal electrode and the third or fourth internal electrode adjacent to the second internal electrode with the insulator layer in between is larger than the distance between the third internal electrode and the fourth internal electrode adjacent to the third internal electrode with the insulator layer in between.

10. The multilayer capacitor according to claim 7, wherein the laminate body has one each of the first and second internal electrodes.

11. The multilayer capacitor according to claim 7, wherein in the laminating direction, the first internal electrode is adjacent to the fourth internal electrode with the insulator layer in between and the second internal electrode is adjacent to the third internal electrode with the insulator layer in between.

12. The multilayer capacitor according to claim 11,
wherein a width of the other end of the second lead portion is larger than the second width,
wherein the other end of the second lead portion is connected to the other end of the first lead portion and opposed to the main electrode portion of the fourth internal electrode in the laminating direction,
wherein a width of the other end of the fourth lead portion is larger than the fourth width, and
wherein the other end of the fourth lead portion is connected to the other end of the third lead portion and opposed to the main electrode portion of the third internal electrode in the laminating direction.

13. The multilayer capacitor according to claim 7,
wherein, when viewed from the laminating direction, the one end of the first lead portion is exposed from a position nearer to the fourth side face in the first side face, and
wherein, when viewed from the laminating direction, the one end of the third lead portion is exposed from a position nearer to the third side face in the second side face.

14. The multilayer capacitor according to claim 7,
wherein the first internal electrode further includes a seventh lead portion extending so that one end thereof with a seventh width is exposed from the first side face, to be connected to the first terminal electrode,
wherein the second internal electrode further includes an eighth lead portion extending so that one end thereof with an eighth width is exposed from the second side face, to be connected to the second terminal electrode,
wherein the other end of the seventh lead portion is connected to the second lead portion,
wherein the other end of the eighth lead portion is connected to the fourth lead portion, and
wherein each of the seventh and eighth widths is not more than the fifth and sixth widths.

* * * * *

UNITED STATES PATENT AND TRADEMARK OFFICE
CERTIFICATE OF CORRECTION

PATENT NO. : 7,646,585 B2 Page 1 of 1
APPLICATION NO. : 12/240589
DATED : January 12, 2010
INVENTOR(S) : Takashi Aoki It is certified that error appears in the above-identified patent and that said Letters Patent is hereby corrected as shown below:

On the Title Page

Item (73) should read:

Assignee: ~~NGK Insulators, Ltd.~~ TDK Corporation, Tokyo (JP)

Signed and Sealed this

Fifth Day of October, 2010

David J. Kappos
*Director of the United States Patent and Trademark Office*